(12) United States Patent
Picardi et al.

(10) Patent No.: US 11,359,991 B2
(45) Date of Patent: *Jun. 14, 2022

(54) SYSTEM AND METHOD FOR WATER LEAK DETECTION

(71) Applicant: Alarm.com Incorporated, Tysons, VA (US)

(72) Inventors: Robert Nathan Picardi, Herndon, VA (US); Matthew Daniel Correnti, Reston, VA (US); Daniel Marc Goodman, Needham, MA (US); Craig Carl Heffernan, Oregon City, OR (US); Peter Richard Williams, Falls Church, VA (US); Harrison Wayne Donahue, Attleboro, MA (US)

(73) Assignee: Alarm.com Incorporated, Tysons, VA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/996,075

(22) Filed: Aug. 18, 2020

(65) Prior Publication Data

US 2020/0378860 A1 Dec. 3, 2020

Related U.S. Application Data

(63) Continuation of application No. 16/042,773, filed on Jul. 23, 2018, now Pat. No. 10,782,204.

(Continued)

(51) Int. Cl.
*G05B 19/042* (2006.01)
*G01M 3/26* (2006.01)
(Continued)

(52) U.S. Cl.
CPC .............. *G01M 3/26* (2013.01); *E03B 7/071* (2013.01); *E03B 7/09* (2013.01); *G01F 15/005* (2013.01);
(Continued)

(58) Field of Classification Search
None
See application file for complete search history.

(56) References Cited

U.S. PATENT DOCUMENTS

| 7,966,099 B2 * | 6/2011 | Fima | G01M 3/2807 |
| | | | 700/276 |
| 8,606,413 B2 * | 12/2013 | Picton | E03B 7/071 |
| | | | 700/282 |

(Continued)

FOREIGN PATENT DOCUMENTS

WO WO2016/161389 10/2016

OTHER PUBLICATIONS

PCT International Search Report in International Application No. PCT/US2018/043328, dated Dec. 19, 2018, 18 pages.

*Primary Examiner* — Jason Lin
(74) *Attorney, Agent, or Firm* — Fish & Richardson P.C.

(57) ABSTRACT

Methods, systems, and apparatus, including computer programs encoded on a storage device, for performing leak detection. In one aspect, the method includes actions of obtaining water consumption data that is based on first sensor data generated by a connected water meter that is installed at a property, determining, based on the obtained water consumption data, (i) that a water leak is occurring at the property and (ii) a type of water leak that is occurring at the property, in response to determining (i) that a water leak is occurring at the property and (ii) a type of water leak that is occurring at the property, determining, based on a type of water leak that is determined to be occurring at the property, an operation to mitigate potential damages caused by the water leak, and initiating performance of the operation in order to mitigate potential damages caused by the water leak.

19 Claims, 9 Drawing Sheets

Related U.S. Application Data

(60) Provisional application No. 62/535,783, filed on Jul. 21, 2017.

(51) Int. Cl.

| | | |
|---|---|---|
| *E03B 7/07* | (2006.01) | |
| *G01F 15/00* | (2006.01) | |
| *G01M 3/28* | (2006.01) | |
| *G05B 23/02* | (2006.01) | |
| *E03B 7/09* | (2006.01) | |

(52) U.S. Cl.
CPC ............ *G01M 3/28* (2013.01); *G05B 19/042* (2013.01); *G05B 23/0218* (2013.01); *G05B 2219/45006* (2013.01)

(56) References Cited

U.S. PATENT DOCUMENTS

| | | | |
|---|---|---|---|
| 9,061,669 B2 * | 6/2015 | Miyazaki | B60T 13/586 |
| 2006/0137090 A1 | 6/2006 | Jeffries et al. | |
| 2010/0204839 A1 | 8/2010 | Behm et al. | |
| 2011/0025511 A1 * | 2/2011 | Wien | G01M 3/2815 |
| | | | 340/605 |
| 2011/0215945 A1 * | 9/2011 | Peleg | G06Q 10/06 |
| | | | 340/870.02 |
| 2014/0255216 A1 * | 9/2014 | Kallesoe | F04D 15/0066 |
| | | | 417/212 |
| 2016/0335875 A1 | 11/2016 | Alcorn et al. | |
| 2016/0349140 A1 | 12/2016 | Teymouri | |
| 2017/0003693 A1 | 1/2017 | Baxter | |
| 2017/0131174 A1 | 5/2017 | Enev et al. | |
| 2017/0197854 A1 | 7/2017 | Chandler, Jr. et al. | |
| 2017/0292893 A1 | 10/2017 | Bunker et al. | |
| 2018/0045599 A1 | 2/2018 | Larach | |

* cited by examiner

SYSTEM AND METHOD FOR WATER LEAK DETECTION

CROSS-REFERENCE TO RELATED APPLICATIONS

This application is a continuation of U.S. application Ser. No. 16/042,773, filed Jul. 23, 2018, which claims the benefit of U.S. Provisional Patent Application No. 62/535,783 filed Jul. 21, 2017 and entitled "System and Method for Water Leak Detection," and each application is hereby incorporated by reference in its entirety.

BACKGROUND

One or more water consuming appliances installed at a property may be configured to routinely consume water. Typically, water consumed by the one or more water consuming appliances installed at the property is routed to the property via a network of one or more pipes. A particular pipe of the network of pipes can connect to the property at a metered connection point where water enters the property for routing to the one or more water consuming appliances. This metered connection point provides a location where all water consumed by one or more water consuming appliances installed at the property can be measured. A water consuming appliance may include a washing machine, a dish washer, a toilet, a shower, an indoor faucet, an outdoor faucet, an irrigation system, or the like.

SUMMARY

According to one innovative aspect of the present disclosure, a system for detecting water leaks is disclosed. The system may include one or more processors and one or more computer storage media storing instructions that are operable, when executed by the one or more processors, to cause the one or more processors to perform operations. The operations may include obtaining, by a water meter analytics unit, water consumption data that is based on first sensor data generated by a connected water meter that is installed at a property remote from the water meter analytics unit, determining, by the water meter analytics unit and based on the obtained water consumption data, (i) that a water leak is occurring at the property and (ii) a type of water leak that is occurring at the property, in response to determining, by the water meter analytics unit, (i) that a water leak is occurring at the property and (ii) a type of water leak that is occurring at the property, determining, by the water meter analytics unit and based on a type of water leak that is determined to be occurring at the property, an operation to mitigate potential damages caused by the water leak, and initiating, by the water meter analytics unit, performance of the operation in order to mitigate potential damages caused by the water leak.

Other aspects include corresponding systems, methods, apparatus, and computer programs to perform actions of methods defined by instructions encoded on one or more computer storage devices.

These and other versions may optionally include one or more of the following features. For instance, in some implementations, the operations may further include determining, by the water meter analytics unit and based on the obtained water consumption data, (i) that a water leak is occurring at the property and (ii) a type of water leak that is occurring at the property includes determining, by the water meter analytics unit and based on the obtained water consumption data, that a water flow rate at the property exceeds a predetermined water flow rate threshold for the property, and based on determining, by the water meter analytics unit and based on the obtained water consumption data, that the water flow rate at the property exceeds the predetermined water flow rate threshold for the property (i) determining that a water leak is occurring and (ii) classifying the water leak as a severe water leak type.

In some implementations, determining, by the water meter analytics unit and based on a type of water leak that is determined to be occurring at the property, an operation to mitigate potential damages caused by the water leak may include in response to determining that a water leak is occurring and that the water leak was classified as a severe water leak type, determining, by the water meter analytics unit, that water supply to the property is to be terminated.

In some implementations, initiating, by the water meter analytics unit, performance of the operation to mitigate potential damages caused by the water leak may include transmitting one or more instructions to the connected water meter that instruct the connected water meter to close a water shut off valve.

In some implementations, the operations may further include obtaining, by the water meter analytics unit and from a sensor installed at the property, second sensor data indicative of property occupancy and determining, by the water meter analytics unit and based on the second sensor data indicative of property occupancy, a water flow rate threshold for the property, wherein determining, by the water meter analytics unit and based on the obtained water consumption data, (i) that a water leak is occurring at the property and (ii) a type of water leak that is occurring at the property may include determining, by the water meter analytics unit and based on the obtained water consumption data, that a water flow rate at the property exceeds the water flow rate threshold for the property that was determined by the water meter analytics unit based on the second sensor data indicative of property occupancy, and based on determining, by the water meter analytics unit and based on the obtained water consumption data, that the water flow rate at the property exceeds the flow rate threshold for the property that was determined by the water meter analytics unit, based on the second sensor data indicative of property occupancy, for the property (i) determining that a water leak is occurring and (ii) classifying the water leak as a severe water leak type.

In some implementations, determining, by the water meter analytics unit and based on the obtained water consumption data, (i) that a water leak is occurring at the property and (ii) a type of water leak that is occurring at the property may include determining, by the water meter analytics unit and based on the obtained water consumption data, that water has been consumed at the property for more than a threshold period of time, and based on determining, by the water meter analytics unit and based on the obtained water consumption data, that water has been consumed at the property for more than a threshold period of time, (i) determining that a water leak is occurring and (ii) classifying the water leak as a minor water leak type.

In some implementations, determining, by the water meter analytics unit and based on a type of water leak that is determined to be occurring at the property, an operation to mitigate potential damages caused by the water leak may include in response to determining that a water leak is occurring and that the water leak was classified as a minor water leak type, determining, by the water meter analytics unit, to generate a notification for a resident of the property indicating the existence of the water leak.

In some implementations, initiating, by the water meter analytics unit, performance of an operation in order to mitigate potential damages caused by the water leak may include transmitting a notification to a mobile device of a resident of the property that is configured to alert the resident of a detected water leak.

In some implementations, initiating, by the water meter analytics unit, performance of an operation in order to mitigate potential damages caused by the water leak may include transmitting one or more instructions to a mobile device of a resident of the property that are configured to trigger, when processed by the mobile device, display of a graphical user interface that (i) alerts the resident of a detected water leak and (ii) outputs a selectable icon that, when selected, triggers transmission of an instruction to the connected water meter instructing the connected water meter to close a water shut off valve.

In some implementations, determining, by the water meter analytics unit and based on the obtained water consumption data, (i) that a water leak is occurring at the property and (ii) a type of water leak that is occurring at the property may include determining, by the water meter analytics unit and based on the obtained water consumption data, that water consumption at the property for a particular time period is abnormal for the property, determining, based on the obtained water consumption data, a water consumption curve that represents current water consumption at the property, obtaining second sensor data from one or more second sensors installed at the property, detecting, by the water meter analytics unit, a portion of the water consumption curve that is unaccounted for based on a disaggregation, by the water meter analytics unit, of the abnormal water consumption data using (i) one or more water consuming appliance signatures and (ii) the obtained second sensor data, and based on detecting the portion of the water consumption curve that is unaccounted for based on the disaggregation, (i) determining that a water leak is occurring and (ii) classifying the water leak as a moderate leak.

In some implementations, determining, by the water meter analytics unit and based on the obtained water consumption data, that water consumption at the property for a particular time period is abnormal for the property, may include determining, by the water meter analytics unit, that the obtained water consumption data for the particular time period indicates that a current water flow rate at the property deviates from a historical flow rate indicated by historical water consumption data for the property for a related time period in the past by more than a threshold amount.

In some implementations, determining, by the water meter analytics unit and based on a type of water leak that is determined to be occurring at the property, an operation to mitigate potential damages caused by the water leak may include in response to determining that a water leak is occurring and that the water leak was classified as a moderate water leak type, determining, by the water meter analytics unit, that a resident of the property should be alerted to the existence of the water leak.

In some implementations, disaggregation, by the water meter analytics unit, the abnormal water consumption data using (i) one or more water consuming appliance signatures and (ii) the obtained second sensor data may include determining, by the water meter analytics unit, one or more water consuming appliance signatures that can be used to reconstruct a water consumption curve.

In some implementations, determining, by the water meter analytics unit, one or more water consuming appliance signatures that can be used to reconstruct a water consumption curve may include selecting, by the water meter analytics unit, a particular water consuming appliance signature for use in reconstructing the water consumption curve based on the obtained second sensor data, wherein the obtained second sensor data indicates that an object has moved near a water consuming appliance, whose water consumption is represented by the particular water consuming appliance signature, within a particular time period.

In some implementations, determining, by the water meter analytics unit, one or more water consuming appliance signatures that can be used to reconstruct a water consumption curve may include disregarding, by the water meter analytics unit, a particular water consuming appliance signature from use in reconstructing the water consumption curve based on the obtained second sensor data, wherein the obtained second sensor data indicates that no object has moved near a water consuming appliance, whose water consumption is represented by the particular water consuming appliance signature, within a particular time period.

DETAILED DESCRIPTION

Figure 1:
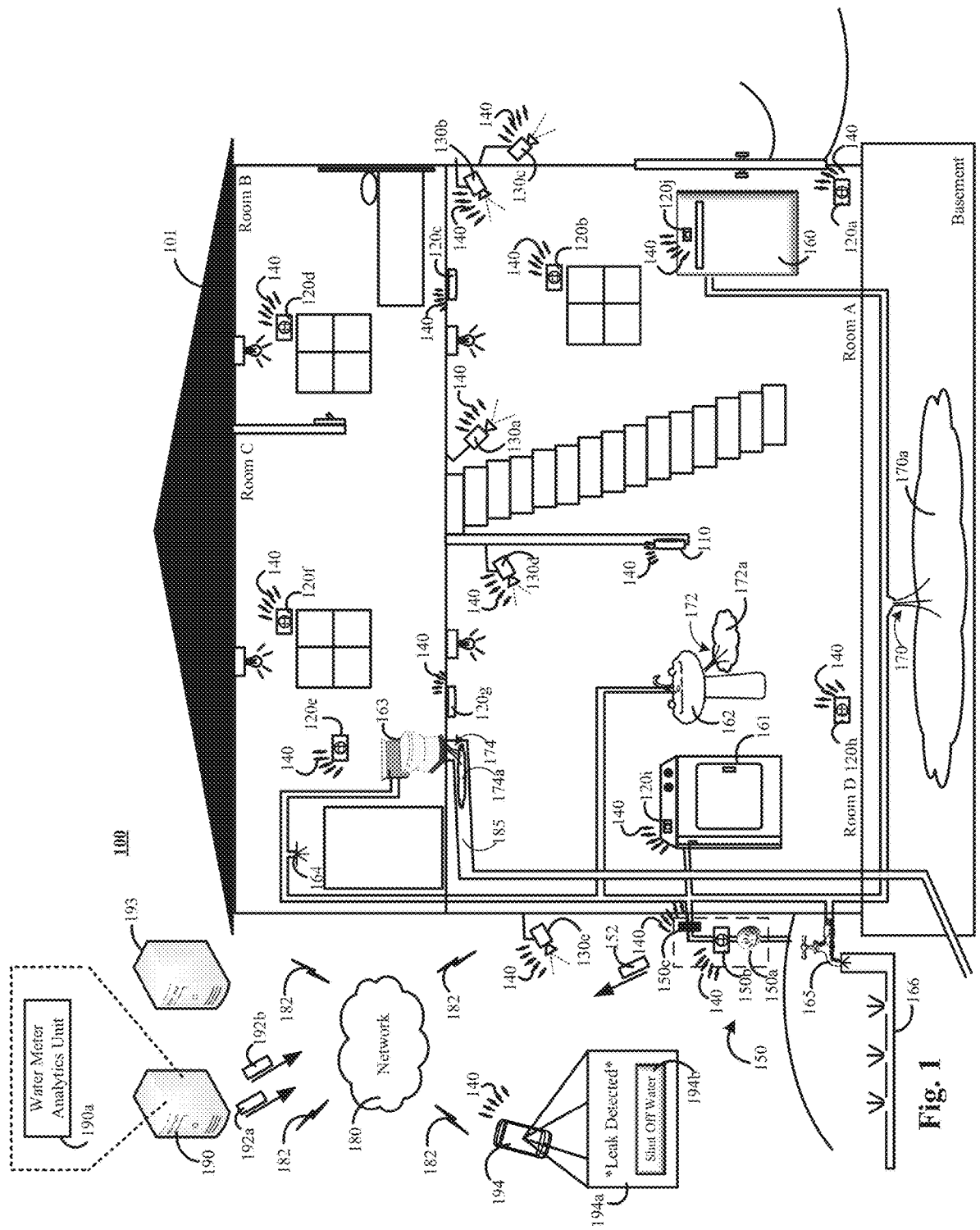
FIG. 1 is a contextual diagram of an example of a connected-home monitoring system for detecting water leaks.

FIG. 1 is a contextual diagram of an example of a connected-home monitoring system 100 for detecting water leaks.

In some implementations, the connected-home monitoring system 100 includes at least a connected water meter 150, one or more water consuming appliances or fixtures (hereinafter "water consuming appliances") 160, 161, 162, 163, 164, 165, 166, and a water meter analytics unit 190a. In other implementations, the connected-home monitoring system 100 may also include a monitoring system control unit 110, one or more monitoring system sensors 120a, 120b, 120c, 120d, 120e, 120f, 120g, 120h, 120i, 120j, one or more cameras 130a, 130b, 130c, 130d, 130e, a network 140, a network 180, communication links 182, a monitoring application server 190, a central alarm station server 193, a user device 194, or a combination thereof.

The connected water meter 150 may include at least a water meter 150a, a sensor 150b, and a connected shutoff valve 150c. The water meter 150a may measure water usage of the property 101 in terms of a unit of volume such as liters, gallons, or the like. Data from the water meter 150a can be used by a utility company to determine a monthly water consumption total. The sensor 150b may include one or more sensors that can detect water consumption at the property 101 and generate sensor data describing the detected water consumption. The generated sensor data may represent characteristics of a property's 101 water consumption rate at a particular time. In some implementations, the generated sensor data may be indicative of amount of water used in gallons. Alternatively, or in addition, the characteristics may include a waveform indicating the shape of a water consumption curve, an amplitude of the underlying water flow rate (e.g., an amplitude of the water consummation curve), a value representing the water flow rate (e.g., gallons per minute), or the like. The generated sensor data can be used to generate periodic consumption reports. For example, the sensor 150b may be configured to generate and report sensor data indicative of water consumption at the property 101 every minute while water is being consumed at the property.

The sensor 150b is configured to detect water consumption data of different flow magnitudes ranging from low flow water usage as small as, for example, 0.01 gallons per min to high flow leaks as great as, for example, 25 gallons per minute. This range of magnitudes also includes the capability of the sensor 150b to detect water consumption data describing one or more water flow rates that falls on the spectrum between 0.01 gallons per min, or less, and 25 gallons per minute, or more.

In some implementations, the sensor 150b may be specially equipped to detect slow flow rates such as 0.01 gallons per minute. For example, the sensor 150b may include a thermal component, a sensing component, and a wireless communication component. The thermal component is configured to heat water in the vicinity of the sensing element. The sensing component can analyze the gradient in the thermal profile of the heated water. For example, the sensing component can determine whether the heated water is displaced by cooler water. If the sensing component determines that the heated water is displaced by cooler water, then water flow can be inferred. The sensing component can determine the displacement of the heated water and convert the displacement of the heated water to a flow rate (e.g., gallons per minute). Alternatively, the sensing component can collect data indicative of the displacement of the heated water and transmit the collected data to another component of the connected-home monitoring system such as a monitoring application server 190. In such instances, the other component of the connected-home monitoring system 100 such as the monitoring application server 190 may convert the collected data to a flow rate (e.g., gallons per minute). On the other hand, if the sensing component determines that the heated water is not displayed by cooler water, then the sensing component may infer that there is no water flow.

As noted above, the aforementioned functionality of using the thermal component to heat water in the vicinity of the sensor, and measure the displacement of the heated water by cooler water may be particularly beneficial when trying to detect extremely low water flows that conventional water sensors may miss. Extremely low water flows include water flows on the order of 0.01 gallons/min. The sensor 150b is otherwise capable of detecting water flow rates 0.02 gallons/ min or more without use of the thermal component. The wireless communication component of the sensor 150b can allow the sensor 150b to transmit data via the network 140, the network 180, or the like using one or more communication links 180.

Generally, the sensor 150b has been described as a sensor that can determine water consumption data for a property based on a detected flow-rate. However, the present disclosure need not be so limited. For example, in some implementations, the sensor 150b also include one or more pressure sensors. The water pressure sensor may provide an indication of a change in water pressure on the sensor 150b. In such implementations, data describing water pressure changes may be included in the water consumption data.

For implementations where water consumption data includes pressure sensor data, the water meter analytics 190a may determine, based on the water consumption data, whether there is a leak at the property 101. Such determinations may be made based on the changes on the back pressure on the sensor 150b, which may include a flow rate sensor. For example, if the obtained sensor data indicates that a flow rate sensor 150b is not activated (e.g., not detecting any water flow), but back pressure has dropped, the water meter analytics unit can determine that a leak may be occurring at the property 101.

The connected water meter 150 may also include a connected shut-off valve 150c. The connected shut-off valve is configured to receive messages across one or more networks 140, 180 from one or more network components of the connected-home monitoring system 100 such the monitoring system control unit 110, monitoring application server 190, a user device 194, or a combination thereof. For example, the monitoring application server 190, the monitoring system control unit 110, a user device 194, or a combination thereof, may transmit a message to the connected shut-off valve 150c that instructs the connected shut-off valve 150c to close the shut-off valve and cut-off the water supply to water consuming appliances installed at the property 101. Alternatively, the monitoring system control unit 110, the monitoring application server 190, the user device 110, or a combination thereof may transmit a message to the connected shut-off valve 150c that instruct the connected shut-off valve 150c to open the shut-off valve and allow water consuming appliances installed at the property 101 to access the water supply.

The connected-home monitoring system 100 can be used to detect multiple different kinds of leaks at a property such as property 101. Though the connected-home monitoring system 100 includes the word "home," and FIG. 1 depicts a house, the connected-home monitoring system 100 is not limited to a home, house, or other residential property. Instead, the connected-home monitoring system can be used in a variety of different properties including, e.g., row homes, apartment buildings, industrial properties (such as factories), commercial properties (such as office buildings, retail locations, or the like), or the like.

With reference to the example of FIG. 1, the connected-home monitoring system 100 is configured to monitor water consumption data describing water consumption at a property and determine, based at least in part on the water consumption data, whether a water leak is occurring at the property 101. By way of example, the connected-home monitoring system is configured to perform one or more processes such as the processes described with reference to FIGS. 6, 7, and 8 to detect various different types of leaks. For example, the connected-home monitoring system 100 can be used to detect potentially catastrophic leaks such as a broken pipe leak 170, relatively moderate leaks such as a leaky sink 172, or small leaks such as leaky toilet 174. In some instances, the connected-home monitoring system 100 can detect concealed leaks that would otherwise be relatively undetectable by an occupant of the property 101. For example, in contrast to leaks 170, 172 that may leave respective pools of water 170a, 172a in plain sight, concealed leaks such as leak 174 may only result in a small amount of water 174a leaking completely within the confines of a pipe 185, behind a wall, or the like. In some instances, the water meter analytics unit 190a may perform each respective leak detection method on collected water consumption data, and evaluate the respective results before performing one or more operations to mitigate potential water damage that may be caused by a potential leak. The detection of each respective leak 170, 172, 174 will be discussed separately below in isolation from each other— i.e., assuming that each respective leak is the only leak in the house—to highlight the different leak detection methods provided by the present disclosure. However, the systems and methods could also trigger a notification of a leak, a shut-off of water at the property, or both, if multiple leaks were occurring at the same property. In such instances, one or more of the leak detection methods would identify the presence of at least one of the leaks.

With reference to the example of FIG. 1, a pipe may burst in a basement of the property 101 when no occupant of the property 101 is present at the property 101. The broken pipe results in a leak 170 that can be potentially catastrophic. The water out of the leak creates water consumption (e.g., water flow) at the property 101 that is detected by the sensor 150b of the connected water meter 150. The sensor 150b may generate and transmit generate and transmit sensor data 152 to the monitoring application server 190 in response to the detection of water consumption (e.g., water flowing) at a property 101. In this example, the sensor data 152 may include water consumption data that is indicative of the amount of water consumed by the property 101 including the water pouring into the basement as a result of the broken pipe leak 170. In some implementations, the connected water meter 150 may generate and transmit sensor data describing water consumption at the property every minute that water is being consumed at the property 101.

The monitoring application server 190 may receive the generated sensor data 152 and provide the generate sensor data to a water meter analytics unit 190a. The water meter analytics unit 190a may include one or more software modules, one or more hardware modules, or a combination of both that are configured to perform the operations attributed to the water analytics unit 190a in the present disclosure. In other implementations, the monitoring application server 190 may receive the generated sensor data 152 and provide data describing water consumption data at the property 101 to the water meter analytics unit 190a that is based on the received sensor data 152. In yet other implementations, the monitoring application server 190 may receive data describing water consumption at the property 101 that is based on the generated sensor data 152 and not receive the sensor data 152 itself. In such instances, the monitoring application server 190 may provide water consumption data describing water consumption data at the property 101 to the water meter analytics unit 190a without provide the actual sensor data 152 to the water meter analytics unit 190a. Accordingly, water consumption data may include sensor data generated by one or more sensors at the property 100. Alternatively, water consumption data may include any data describing water consumption of water consuming appliances at the property 101 based on the sensor data 152.

The water meter analytics unit 190a is configured to analyze the received water consumption data that is indicative of the water consumption by the property 101. The water meter analytics unit 170a can determine a flow rate of water that is being consumed by the property. In the example of FIG. 1 and the pipe burst 170, a large amount of water may be pouring out of the pipe 170 per minute. The water meter analytics unit 170a can evaluate the water consumption at the property 101 by analyzing the water consumption data received from the connected water meter 150. The water meter analytics unit 190a may determine whether flow rate of water consumed by the property 101 exceeds a flow rate threshold. In response to determining that the flow rate of water exceeds the flow rate threshold (e.g., "X" gallons per minute, where "X" is any positive, non-zero integer), the water meter analytics unit 190a may determine that there is a potential large water leak at the property 101. In such instances, the water meter analytics unit 190a may perform one or more operations to mitigate damage that can occur as a result of the potentially large water leak. For example, the water meter analytics unit 190a can generate and transmit a message 192a to the connected water meter 150 via the network 180, network 140, and one or more communication links 182 that instructs the connected shut-off valve 150c to close. In response, the connected shut-off valve 150c may receive the message, process the instructions included in the message, and close the connected water value 150c, thereby cutting the property 101 off from the water supply and stopping the leak. Cutting off the water supply to stop a potentially catastrophic leak can help a property owner save significant amounts of money in property damage.

Other operations can be performed by the water meter analytics unit 180 to mitigate damage that can occur as a result of the detection of a potentially large water leak. For example, the water meter analytics unit (or other software unit of monitoring application server 190) can transmit a notification to a legitimate occupant of a property 101 to notify the legitimate occupant of the property 101 of the potentially catastrophic leak. Such a notification 192b may be transmitted by the monitoring application server 190 to a user device 194 of the legitimate occupant of the property via the networks 180, 140 and one or more communications links 182. The notification may trigger the display of a graphical user interface 194a. The graphical user interface 194a may display visual representations of the water consumption data for the property 101 such as the visual representations of water consumption data shown in FIGS. 3 and 4. The graphical user interface 194a may also provide the legitimate occupant the property with a selectable icon 194b whose selection can trigger an instruction to be transmitted to the connected shut-off valve 150c to initiate closing of the connected shut-off valve 150c.

In some implementations, the flow rate threshold that is used to detect the pipe burst leak 170 may be a predetermined threshold. For example, the water meter analytics unit 190a may detect a potential leak if water flow at a property 101 is determined to be more than 25 gallons per minute. Alternatively, in other implementations, the flow rate threshold may be dynamically determined based on sensor data obtained from one or more monitoring sensors 120a, 120b, 120c, 120d, 120e, 120f, 120g, 120h, 120i, 120j.

The water meter analytics unit 190a may establish a dynamically determined flow rate threshold based on a variety of factors associated with a property 101 (or 201) such as sensor data from energy sensors 120i and 120j indicating whether the washing machine 161 and a dishwasher 160 are respectively powered on (or off), sensor data from motion sensors 120a, 120e, 120h indicating whether movement is detected within the property, sensor data indicating the number of occupants detected within the property (e.g., using motion sensors, location from user devices, user device pings, the state of the monitoring system (e.g., unarmed home), or a combination thereof. This alternative implementation may be further described with reference to both FIG. 1 and FIG. 2.

By way of example, with reference to FIG. 1, the water meter analytics unit 190a may have established a dynamically determined flow rate threshold of, for example, 5 gallons per minute. The water meter analytics unit 190a may set the flow rate threshold of, for example, 5 gallons per minute because the water meter analytics unit 190a based on data obtained from one or more components of the controlled-home monitoring system 100. For example, the water meter analytics unit 190a may obtain (i) sensor data (or lack thereof) from energy sensors 120i and 120j respectively indicate that the washing machine 161 and dish washer 160 are not powered on, (ii) data indicating that the controlled-home monitoring system 100 is in the "armed-away" state, and (iii) sensor data from motion sensors 120a, 120e, 120h (or other occupancy detection techniques such as user device location information) indicate that there are no occupants at home in property 101. Accordingly, the water meter analytics unit 190a can set a lower flow rate threshold such as 5 gallons per minute because no occupant is at the property using water and no water consuming appliances at the property are using water. Under such a scenario, a pipe burst leak 170 may create a 5 gallons per minute flow rate, and the water meter analytic unit 190a may detect the pipe burst leak 170 because the pipe burst leak 170 created water consumption (e.g., water flow) great than 5 gallons per minute.

Figure 2:
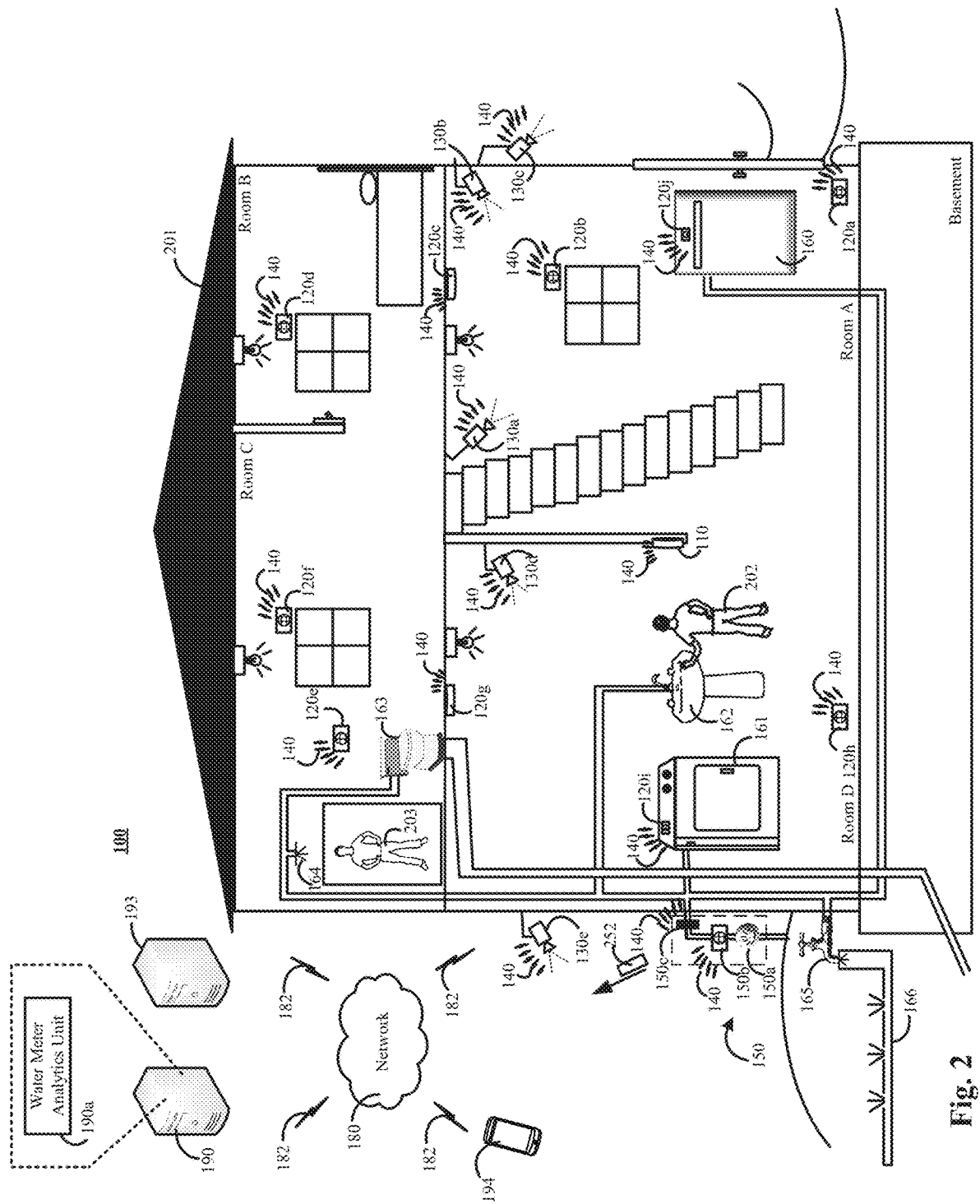
FIG. 2 is another contextual of an example of a connected-home monitoring system for detection water leaks.

On the other hand, FIG. 2 is another contextual of an example of a connected-home monitoring system 200 for detection water leaks. The connected-home monitoring system 200 is the same as connected-home monitoring system 100. However, in the example of FIG. 2, multiple property occupants are occupying the property 201. A property occupant may include, for example, a property resident, a guest of a property resident, or any non-trespassing person.

By way of example, with reference to FIG. 2, the water meter analytics unit 190a may set a higher flow rate threshold such as, for example, 15 gallons per minute based on sensor data obtained from one or more monitoring system sensors 120a, 120b, 120c, 120d, 120e, 120f, 120g, 120h, 120i, 120j of the connected-home monitoring system 200. In such instances, the higher flow rate threshold is established based on data that the water meter analytics unit 190a obtains from one or more controlled-home monitoring system 200. For example, the water meter analytics unit 190a may obtain (i) sensor data (or lack thereof) from energy sensors 120i and 120j respectively indicating that the washing machine 161 and dish washer 160 are powered on, (ii) data indicating that the controlled-home monitoring system 100 is in the "unarmed-home" state, and (iii) sensor data from motion sensors 120a, 120e, 120h (or other occupancy detection techniques such as user device location information) indicate that there are multiple occupants at the property 202. Accordingly, the water meter analytics unit 190a can set a higher flow rate threshold such as 15 gallons per minute because multiple occupants are at the property 201 are using water and multiple water consuming appliances at the property 201 are using water. Under such a scenario, multiple occupants 202, 203 can use more than 5 gallons of water per minute (and less than 15 gallons per minute) without exceeding the higher flow rate threshold of 15 gallons per minute.

Accordingly, the same controlled-home monitoring system may establish a different dynamic flow rate threshold for leak detection based on data obtained from one or more components of the controlled-home monitoring system such as the number water consuming appliances known to be using water, the state of the controlled-home monitoring system, the number of occupants of the property, or the like.

Continuing the example of FIG. 1, a toilet 163 may have a relatively small toilet leak 174 when compared to the potentially catastrophic burst pipe leak 170. The toilet leak 174 is an example of a consistent, extremely slow flow of a small amount of water 174a because, for example, the toilet 163 is continuously running to replace the amount of water that is leaking into the pipe 185. Since the leak 174 and any accumulated water 174a from the leak is completely concealed within the pipe 185. Such leaks may be hard, if not impossible, for a property occupant to spot and can cost the property occupant significant amounts of money in utility bills.

With further references to the example of FIG. 1, the sensor 150b may generate and transmit sensor data 152 to the monitoring application server 190 in response to the detection of water consumption (e.g., water flowing) at a property 101. The sensor 150b may be configured to detect consistent, extremely low leaks (e.g., 0.01 gallons per second, or less) by using a thermal component to heat water in the vicinity of a sensing component, and then evaluating the thermal profile of the water in the vicinity of the sensing component. In this example, the sensor 150b may generate sensor data 152 based on the evaluation of the thermal profile that is indicative of the flow of water at the property 101. Evaluation of the thermal profile of the water in the vicinity of the sensing component may be based on the displacement of heated water by incoming cooler water. The generated sensor data may be periodically transmitted, for example, every minute that water is being consumed at the property 101. The monitoring application server 190 may receive the generated sensor data 152 and provide generate sensor data to a water meter analytics unit 190a.

The water meter analytics unit 190a is configured to analyze the received water consumption data that is indicative of the water consumption by the property 101 for the detection of a potential leak. In this example of the consistent, extremely slow low flow toilet leak 174 (e.g., 0.01 gallons per minute, or even less) of FIG. 1, the water meter analytics unit 190a can evaluate the water consumption data received from the property 101 to determine whether the consumption (or flow) of water has been detected at the property 101 for more than a predetermined amount of time. In response to determining that the consumption (or flow) of water has been detected for more than a predetermined period of time (e.g., 1 hour, 3 hours, 5 hours, or the like), the water meter analytics unit 190a may determine that there is a potential extremely slow, low flow leak (e.g., 0.01 gallons per minute, or even less) at the property 101. In such instances, the water meter analytics unit 190a may perform one or more operations to mitigate damage that can occur as a result of the potentially large water leak. For example, the water meter analytics unit 190a (or other software unit of monitoring application server 190) can transmit a notification to a legitimate occupant of a property 101 to notify the legitimate occupant of the property 101 of the small leak. Such a notification 192b may be transmitted by the monitoring application server 190 to a user device 194 of the legitimate occupant of the property via the networks 180, 140 and one or more communications links 182. The notification may trigger the display of a graphical user interface 194a. The graphical user interface 194a may display visual representations of the water consumption data for the property 101 such as the visual representations of water consumption data shown in FIG. 3, FIG. 4, or both in response to user requests for such information.

In the instance of an extremely slow, low flow leak (e.g., 0.01 gallons per minute, or even less), the water meter analytics unit 190a can still transmit a message 192a with instructions to the connected shut-off valve 150c at the property 101 to initiate closing of the shut-off valve 150c. However, such an approach is not the primary mode of operation for the water meter analytics unit 190a in response to extremely slow, low flow leaks (e.g., 0.01 gallons per minute, or even less). Because the likelihood of property damage from such extremely slow, low flow leaks (e.g., 0.01 gallons per minute, or even less) is less likely. However, the graphical user interface 194a may still provide the legitimate occupant the property with a selectable icon 194b whose selection can trigger an instruction to be transmitted to the connected shut-off valve 150c to initiate closing of the connected shut-off valve 150c in response to a detected extremely slow, low flow leaks (e.g., 0.01 gallons per minute, or even less) if the legitimate occupant deems such action appropriate.

The example of a concealed, slow-flow leak described herein is used to describe a toilet leak 174 that leaks into a pipe behind a wall. However, the system and method described above can be used to detect other concealed leaks such as a leaking irrigation system 166 that may be slowly leaking underground. Alternatively, however, detection of a leaking irrigation systems may not be limited to only use of the slow-flow leak techniques. Other techniques such as the large-size leak detection method described above with respect to the burst pipe leak 170 or the medium sized leak detection method described below with respect to the leaking sink 172 may also be used to detect an irrigation system 166 leak. The leak detection method used to detect the irrigation system 166 leak (or any other water consuming appliance installed at the property 101) may be based on the severity of the leak. In some implementations, the water meter analytics unit 190a can periodically (or continuously) monitor water consumption by the property 101 using each of the leak detection methods described herein.

Continuing the example of FIG. 1, a sink 162 may have a medium sized sink leak 174 when compared to the potentially catastrophic burst pipe leak 170 and the relatively small toilet leak 174. The sink leak 174 is a leak that is of a sufficient size that the sink leak 172 may be sufficient enough to register enough water consumption as one or water consuming appliances installed at the property 101. Fast detection of such a leak is important because it may be sufficient to cause pooling of water 172a that can cause significant damage to a property 101. Detection of such a medium size leak may require the water meter analytics unit 190a to use water disaggregation techniques.

With further references to the example of FIG. 1, the sensor 150b may generate and transmit generate and transmit sensor data 152 to the monitoring application server 190 in response to the detection of water consumption (e.g., water flowing) at a property 101. The sensor data may include water consumption data in the form a waveform indicating the shape of a water consumption curve, an amplitude of the underlying water flow rate (e.g., an amplitude of the water consummation curve), a value representing the water flow rate (e.g., gallons per minute), or the like that represents a total amount of water being consumed by the property. The generated sensor data may be periodically transmitted, for example, every minute that water is being consumed at the property 101. The monitoring application server 190 may receive the generated sensor data 152 and provide generate sensor data to a water meter analytics unit 190a.

The water meter analytics unit 190a is configured to analyze the received water consumption data that is indicative of the water consumption by the property 101 for the detection of a potential leak. In this example of medium-sized sink leak 172 of FIG. 1, the water meter analytics unit 190a can evaluate the water consumption data received from the property 101. Evaluating the water consumption data received from the property 101 can include disaggregating the water consumption data to identifying each particular instances of overlapping water consumption use at the property 101.

Overlapping water consumption use by multiple water consuming appliances results in an aggregate water consumption total that may be represented as a flow rate such as gallons per minute at any particular point in time of when multiple water consuming appliances are consuming water at the property 101. For example, assume that washing machine 161, dish washer 160, and the sink 162 are all start using water at the same time. In this example, the washing machine 161 may use 3 gallons per minute while filling up, the dish washer 160 may use 2 gallons per minute while filling up, and the sink 162 may use 1 gallon per minute while running. When all three water consuming appliances are consuming water at the same time, the aggregate water consumption total is 6 gallons per minute.

The water meter analytics unit 190a may be configured to disaggregate the aggregated water use using predetermined water consumption appliance signatures. Disaggregating aggregated water consumption may include the water meter analytics unit 190a reverse engineering the water consumption totals represented by water consumption data obtained from a particular property 101. Reversing engineering the water consumption totals may include iteratively analyzing water consumption appliance signatures of water consumption devices installed at a property 101 in an effort to replicate the water consumption use at the property. By way of example, each water consuming appliance signature may include data representing water consumption use by the water consuming appliance represented by the water consuming appliance signature. For example, a water consuming appliance signature for a dish washer may indicate that the dishwasher may use 2 gallons per minute when filling up. The water meter analytics unit 190a can then disaggregate overlapping water consumption events by iteratively analyzing each respective combination of water consuming appliance signatures until water consumption data such as a waveform indicating the shape of a water consumption curve, an amplitude of the underlying water flow rate (e.g., an amplitude of the water consummation curve), a value representing the water flow rate (e.g., gallons per minute), or the like, determined from water consumption data obtained from a property 101 is matched using the water consuming appliance signatures.

In some implementations, the water meter analytics unit 190a may intelligently select the two or more known water consuming appliance signatures for use in reverse engineering the aforementioned waveform, the aforementioned amplitude, the aforementioned flow rate, or a combination thereof, associated with a property's 101 water consumption for a particular time period. In some implementations, intelligently selecting two or more water consuming appliance signatures for use in reverse engineering the aforementioned waveform may include identifying a subset of known water consuming signatures that can be used to reverse engineer the waveform. Identifying a subset of known water consuming appliance signatures may include removing one or more known water consuming appliance signatures from consideration during the iterative reverse engineering process. For example, the water meter analytics unit 190*a* may remove from consideration each water consuming appliance signature that is associated with an amplitude representing water flow rate that is greater than the aggregate amplitude of the water consumption data associated with overlapping water consumption event at the property 101. This intelligent selection of known water consuming appliances signatures may reduce the number of iterations required to reverse engineer an overlapping event.

Alternatively, or in addition, the water meter analytics unit 190*a* may eliminate (or disregard) one or more water consuming appliance signatures from consideration during the iterative process based on the current state of the connected-home monitoring system 100 depicted in FIG. 1. For example, the connected-home monitoring system depicted by FIG. 1 may be in an armed-away state. An armed away state may include, for example, an arming of the connected-home monitoring system 100 to a monitoring configuration that includes a number of predetermined settings that can monitor the property 101 during a period of time when each occupant of the property 101 is away from the property 101. In such instances, the connected-home monitoring system 100 can know that there are no occupants at home using a water consuming appliance. Accordingly, when it t known that there are no occupants at the property 101 water consuming appliance signatures for water consuming appliances such as a sink 161, a shower 164, or the like can be removed from the subset of known water consuming appliance signatures that will be used to reverse engineer an overlapping water consumption event that is identified by the connected water meter 150, the water meter analytics unit 190*a*, or both. Instead, known water consuming appliance signatures for water consuming appliances that can use water while a property occupant is away from the property may initially be relied on to reverse engineer an overlapping event. For example, known water consuming signatures for a dish washer 160, a washing machine 161, an outdoor irrigation system, or the like may initially be used to reverse engineer an overlapping water consumption event with a connected-home monitoring system 100 in an armed-away state. This intelligent selection of known water consuming appliance signatures may reduce the number of iterations required to reverse engineer an overlapping event.

Alternatively, or in addition, the water meter analytics unit 190*a* may eliminate one or more water consuming appliance signatures from consideration during the iterative process based on data from other sensors of the monitoring system. In some implementations, for example, the water meter analytics unit 190*a* may use energy metering data from one or more energy sensors 120*i*, 120*j* as a means to intelligently eliminate water consuming appliance signatures from consideration during the iterative process. For example, the monitoring application server may monitor the output of one or more energy sensors 120*j* installed at the property and determine, based on the energy metering data detected by the one or more energy sensors 120*j*, that the energy being used by a dishwasher 160 at the property fails to satisfy a predetermined threshold (e.g., only a minimal amount of energy is being used by the dishwasher to power LEDs on the control panel, less energy is being used to by the dishwasher than is required to run the dishwasher's motor, or the like). Alternatively, or in addition, the water meter analytics unit 190*a* may determine, based on the energy metering data obtained from sensor 120*i*, that energy being used by a washing machine 160 satisfies a predetermined threshold (e.g., a sufficient enough energy to power LEDs on the washing machine control panel and run the washing machine motor). In such instances, the water meter analytics unit 190*a* may remove the water consuming appliance signature for the dishwasher 120*i* from use in the iterative process of disaggregating water consumption data because the low energy use by the dishwasher 160 indicates that the dish washer 160 is not running and consuming water. On the other hand, the water meter analytics unit 190*a* may continue to use the water consuming appliance signature for the washing machine 161 during the iterative process of disaggregating water consumption data because energy metering data indicates that the washing machine 161 is likely running its motor, and therefore likely consuming water.

Continuing with the example of the medium sized sink leak 172 of FIG. 1, the water meter analytics unit 190*a* may detect the medium sized sink leak 172 using disaggregation techniques. The water consuming appliance may obtain water consumption data representing water consumption at the property 101. The water consumption data may represent water consumption at the property using a waveform indicating the shape of a water consumption curve, an amplitude of the underlying water flow rate (e.g., an amplitude of the water consummation curve), a value representing the water flow rate (e.g., gallons per minute), or a combination thereof. The water consumption data may be indicative of the total water consumption at the property 101 including water consumption used by each water consuming appliance installed and active at the property and water consumed by the sink leak 172. The water meter analytics unit 190*a* may access water consuming appliance signature for the dish washer 160, the washing machine 161, the sink 162, the toilet 163, the shower 164, outdoor faucet 165, and the irrigation system 166. The water meter analytics unit 190*a* intelligently select a subset of the water consuming appliance signatures for use in reverse engineering the water consumption data obtained from the property.

In the example of FIG. 1, the water meter analytics unit 190*a* may be able to eliminate water consuming appliance signature for the shower 164, the toilet 163, and the sink 162 because no occupants of the property 101 are present in the property. Lack of occupancy may be determined because the controlled-home monitoring system 100 is in the "armed-away" state, based on lack of motion detected from one or more motion sensors 120*a*, 120*e*, 120*h*, lack of property occupant mobile devices being located at the property 101, or a combination thereof. Similarly, the water meter analytics unit 190*a* can determine based on data from energy sensor 120*j* that the dish washer 160 is off and eliminate the dish washer's 160 water consuming profile from consideration. Accordingly, the water meter analytics unit 190*a* may select water consuming signatures for the washing machine 161 and the irrigation system 166 for use in reverse engineering the property's data representing the property's 101 water consumption rate.

In this example, the water meter analytics unit 190*a* may determine that even after combining the water consuming signatures for the washing machine (which can be determined to be running based on energy sensor 120*i*) and the irrigation system 166, there is still an amount of water usage that is left unaccounted for. The water meter analytics unit 190*a* may also determine that the unaccounted water usage does not match any water consuming signatures associated with a water consuming appliance installed at the property 101. In such instances, the water meter analytics unit 190a may determine that there is a potential leak at the property 101.

In such instances, the water meter analytics unit 190a may perform one or more operations to mitigate damage that can occur as a result of the medium sized leak such as leak 172. For example, the water meter analytics unit 190a can generate and transmit a message 192a to the connected water meter 150 via the network 180, network 140, and one or more communication links 182 that instructs the connected shut-off valve 150c to close. In response, the connected shut-off valve 150c may receive the message, process the instructions included in the message, and close the connected water value 150c, thereby cutting the property 101 off from the water supply and stopping the leak 172. Cutting off the water supply to stop a medium sized leak such as leak 172 can help a property owner save significant amounts of money in property damage.

Other operations can be performed by the water meter analytics unit 180 to mitigate damage that can occur as a result of the detection of a potentially large water leak. For example, the water meter analytics unit 190a (or other software unit of monitoring application server 190) can transmit a notification to a legitimate occupant of a property 101 to notify the legitimate occupant of the property 101 of the medium leak 172. Such a notification 192b may be transmitted by the monitoring application server 190 to a user device 194 of the legitimate occupant of the property via the networks 180, 140 and one or more communications links 182. The notification may trigger the display of a graphical user interface 194a. The graphical user interface 194a may display visual representations of the water consumption data for the property 101 such as the visual representations of water consumption data shown in FIGS. 3 and 4. The graphical user interface 194a may also provide the legitimate occupant the property with a selectable icon 194b whose selection can trigger an instruction to be transmitted to the connected shut-off valve 150c to initiate closing of the connected shut-off valve 150c.

Figure 3:
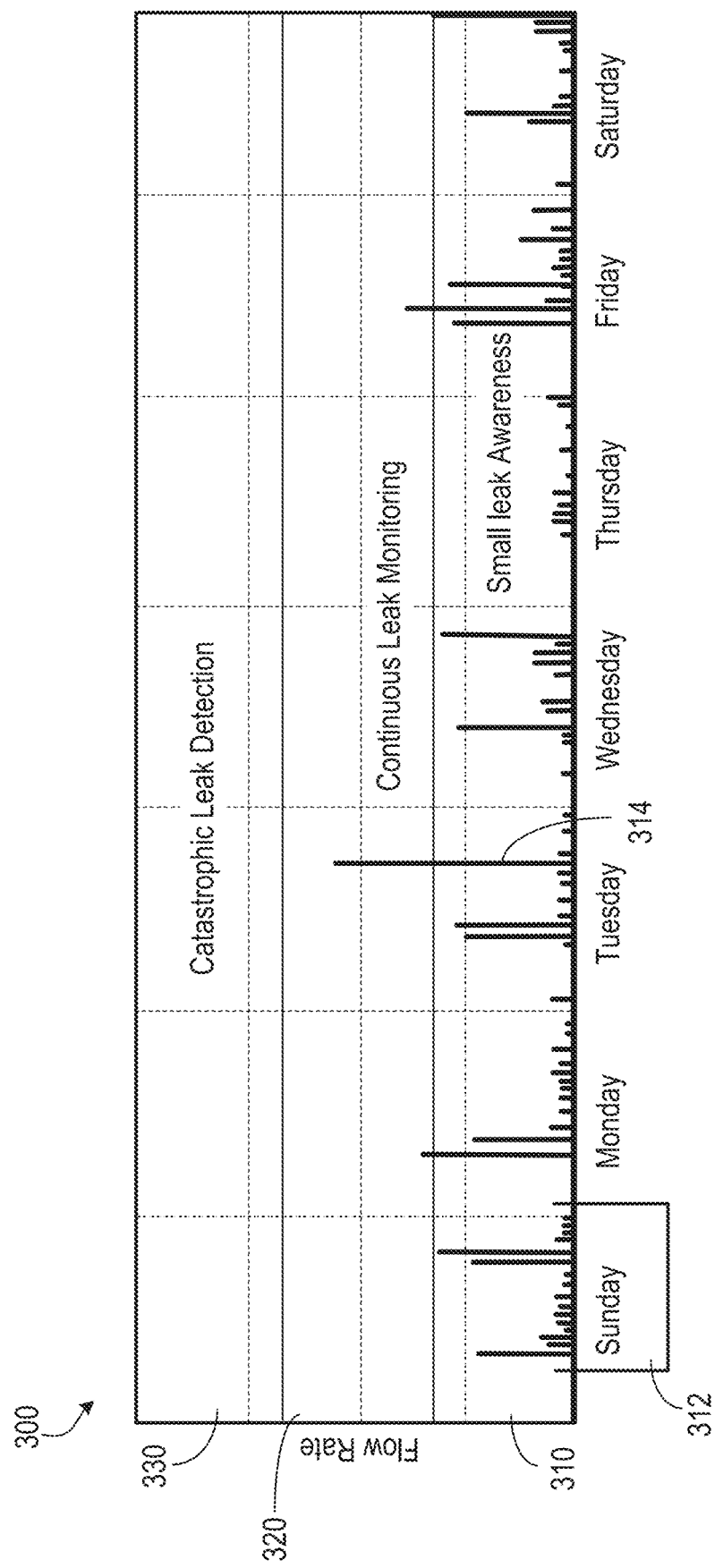
FIG. 3 is an example of water consumption data that is been visualized using a bar graph.

FIG. 3 is an example of water consumption data that is been visualized using a bar graph 300. Bar graph 300 rendering data that can be used to render the bar graph 300 may be provided to user device 194 from one or more server computers such as monitoring application server 190 via one or more networks 180, 140. Once received by the user device 194, the user device 194 may process the bar graph 300 rendering data using a rendering engine in order to generate the bar graph 300 for display in the user interface of the user device 194. In some implementations, the bar graph 300 rendering data (or a link thereto) may be provided to the user device 194 as part of a notification from the water meter analytics unit 190a after the water meter analytics unit 190a detects a potential leak. Alternatively, the bar graph 300 rendering data may be provided to the user device 194 in response to a user request (e.g., selection of a link referencing the bar graph 300) submitted via mobile application, mobile web browser, or the like running on a mobile device.

The bar graph 300 may include an x-axis that measures time (e.g., minutes, hours, days, etc.), a y-axis that measures water flow rate (e.g., gallons per minute) or aggregate water consumption (e.g., gallons), plurality of leak magnitude regions 310, 320, 330 and data 314 indicating water consumption data at a property. The water consumption data may include a flow rate. The leak magnitude regions may visually indicate different water consumption flow rate thresholds. The leak magnitude regions allow a user to easily determine if a detected water consumption flow rate has exceeded established leak thresholds. In one implementation, the leak magnitude regions may include a "small leak awareness" region 310, a "continuous leak monitoring" region 320, a "catastrophic leak detection" region 330, or the like. Potential continuous or catastrophic leaks may be identified by evaluating whether data 314 such as a bar of a bar graph has crossed into one or more the aforementioned regions. For example, the data 314 identifying water usage at a point in time on Tuesday may have been indicative of a potential leak. The longer data identifying water consumption flow rate stays within one or more of the continuous leak region or the catastrophic leak region, the more like there is to be a leak.

The bar graph 300 may also be used to identify small leaks. For example, a potential leak may exist if the bar graph shows consistent water usage that does not stop for more than a predetermined amount of time. Such potential leaks may be identified by analyzing continuous portions such as portion 312 of the x-axis of the bar graph.

Figure 4:
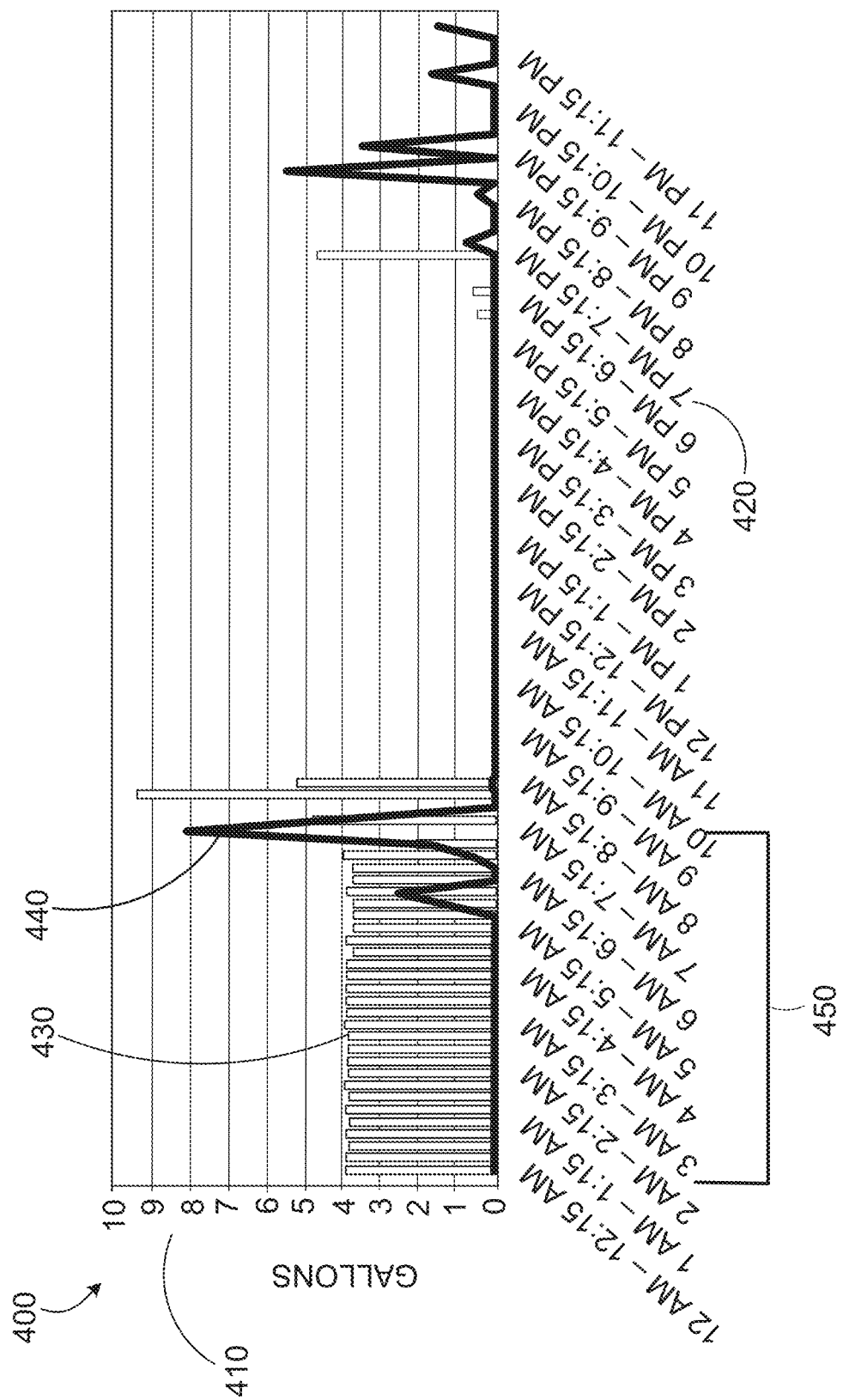
FIG. 4 is an example of water consumption data that has been visualized using a combination graph.

FIG. 4 is an example of water consumption data that has been visualized using a combination graph 400. Combination graph 400 rendering data that can be used to render the combination graph 400 may be provided to user device 194 from one or more server computers such as monitoring application server 190 via one or more networks 180, 140. Once received by the user device 194, the user device 194 may process the combination graph 400 rendering data using a rendering engine in order to generate the combination graph 400 for display in the user interface of the user device 194. In some implementations, the combination graph 400 rendering data (or a link thereto) may be provided to the user device 194 as part of a notification from the water meter analytics unit 190a after the water meter analytics unit 190a detects a potential leak. Alternatively, the combination graph 400 rendering data may be provided to the user device 194 in response to a user request (e.g., selection of a link referencing the combination graph 400) submitted via mobile application, mobile web browser, or the like running on a mobile device.

The combination graph 400 may include a y-axis 410 that measures water flow rate (e.g., gallons per minute) or aggregate water consumption (e.g., gallons), an x-axis 420 that measures time (e.g., minutes, hours, days, etc.), a bar graph 430 depicting actual water consumption at a property, and a line graph 440 showing typical (or normal) water usage at the property. A user may analyze the graph data depicted in the combination graph 400 for the presence of leaks. Since water consumption at a property is typically intermittent throughout a particular day, a leak may be detected based on water consumption data such as the bar graph 430 showing a continuous use of water at the property during the time period 450 from 12:00 am to 7:15 am. This is a time period when every occupant of the property is typically sleeping and not using water. As a result, such water consumption data may be indicative of a leak.

Figure 5:
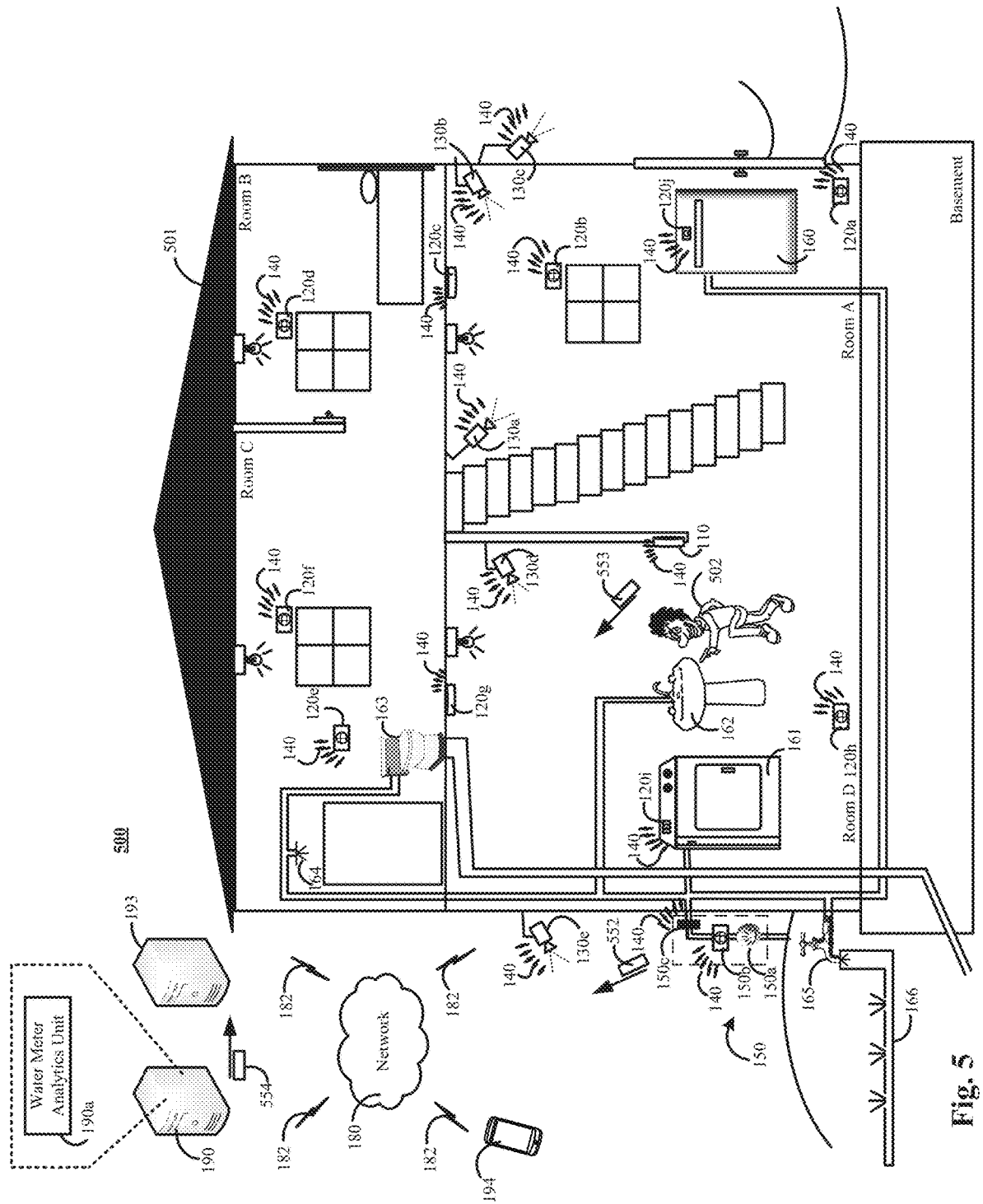
FIG. 5 is another contextual example of using a connected-home monitoring system for detection of water leaks to trigger an alarm event.

FIG. 5 is another contextual example of using a connected-home monitoring system 100 for detection of water leaks to trigger an alarm event.

The connected-home monitoring system 500 of FIG. 5 is the same as the connected-home monitoring system 100 of FIG. 1. The connect-homed monitoring system 500 may be set to the state of "armed-away" indicating that the property 501 occupants are not present at the property 501. In such instances, the water meter analytics unit 190a may respond to the presence of water consumption at the property 501 to trigger a potential alarm event.

For example, an intruder 502 may implement a plan that allows the intruder to break-into the property 501 without triggering an alarm event. For example, the intruder 502 may have been successful in jamming sensors such as motion sensors 120a, 120e, 120, glass break sensors 120b, 120d, 120f, or the like. Alternatively, or in addition, the intruder may have successfully smashed the monitoring system control unit 110 before an alarm signal could be sent to a monitoring application server 190 or central alarm station server 193. Alternatively, or in addition, the intruder 502 may have entered the property 502 in a portion of the property not protected by door contact sensors, window contact sensors, motion sensors, glass break sensors, or the like. These ways of entering the property 501 without triggering an alarm event are just examples, and other ways of entering the property 501 without triggering an alarm event may exist.

In such instances where an intruder is successful in gaining access to the property 501 without triggering an alarm event, the water meter analytics unit 190a may trigger an alarm event in response to the usage of water. For example, the water meter analytics unit 190a may determine, based on data describing the state of the connected-home monitoring system 100, sensor data from one or more sensors installed at the property, scheduling data uploaded to the monitoring application server 190 by a property occupant, or a combination thereof, that no legitimate property occupants are supposed to be present at the property 501. The intruder 502 may use water at the property by, for example, washing his hands off at the sink 162 after cutting throw a wall of the property 501. Then, the water meter analytics unit may receive water consumption data 552 indicating that water is being used at the property 501. In some implementations, the water consumption data 552 may be transmitted to the monitoring application server 190 via the networks 140, 180 and communication links 182 and provided to the water meter analytics unit 190a. In other implementations, the water consumption data 552 may be routed through the monitoring system control unit 110 (if still functioning after the intruder breaks-in) and then forwarded to the monitoring application server 190 and provided to the water meter analytics unit 190a. In such instances, the water meter analytics unit 190a can trigger an alarm event and notify 554 the central station server 193 that a potential alarm event is occurring at the property 501. The central station server 193 may dispatch local authorities to the property 501 to investigate the potential event.

Figure 6:
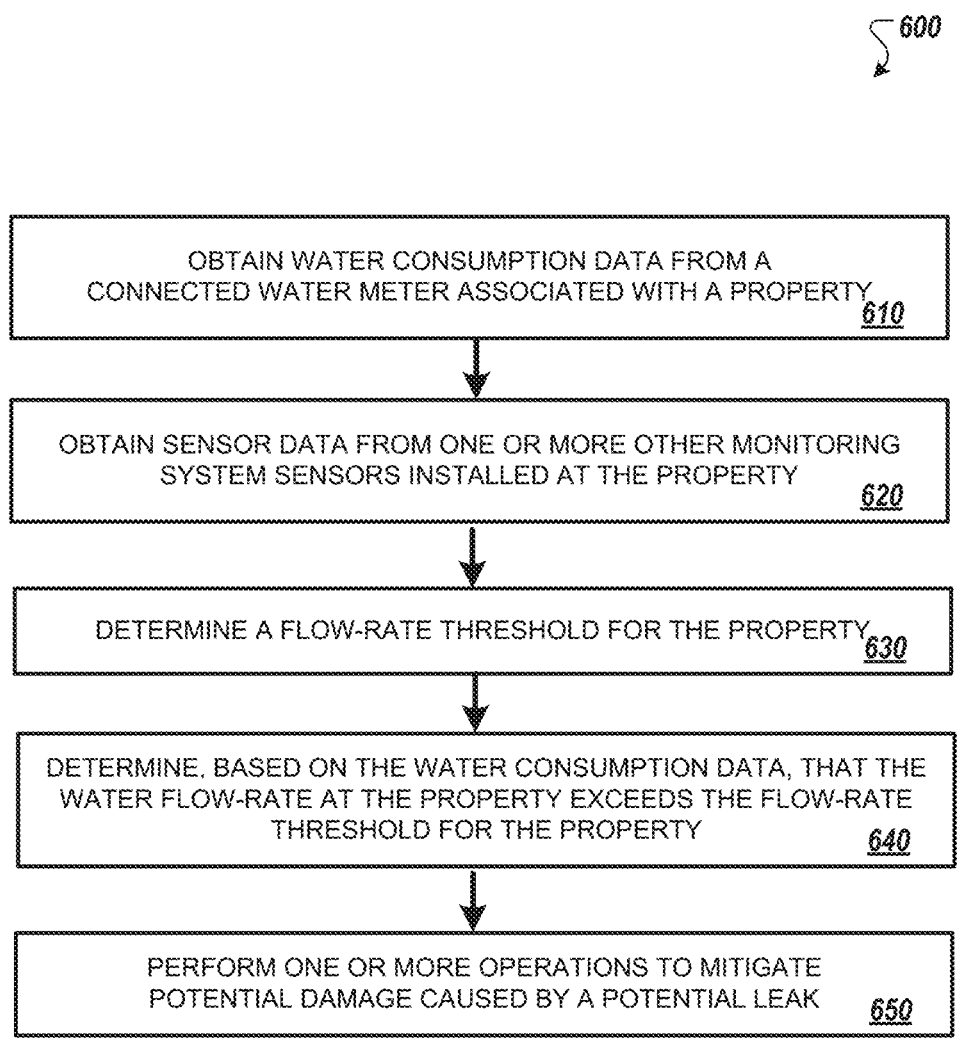
FIG. 6 is a flowchart of an example of a process for detecting a water leak.

FIG. 6 is a flowchart of an example of a process 600 for detecting a water leak. Generally, the process 600 includes obtaining water consumption data from a connected water meter associated with a property (610), obtaining sensor data form one or more monitoring system sensors installed at the property (620), determining a flow rate threshold for the property (630), determining, based on the water consumption data, that the water flow rate at the property exceeds the flow rate threshold for the property (640), and performing one or more operations to mitigate potential damage caused by the potential leak (650). For convenience, the process 600 will be described below as being performed by a server such as the monitoring application server 190 of FIGS. 1, 2, and 4.

In more detail, the server begins performing the process 600 by obtaining 610 water consumption data from a connected water meter associated with a property. In some implementations, the water consumption data may include sensor data generated by one or more sensors at the property that describes water consumption at the property. In other implementations the water consumption data may include data describing water consumption data that is based on the sensor data generated by one or more sensors at the property without receiving the sensor data generated by the one or more sensors itself. The water consumption data may include data describing water consumption at the property such as a waveform indicating the shape of a water consumption curve, an amplitude of the underlying water flow rate (e.g., an amplitude of the water consummation curve), a value representing the water flow rate (e.g., gallons per minute), or the like. The water consumption data may be generated by a sensor that is associated with the connected water meter based on the sensors detection of the water flow rate. The water consumption data may be obtained from a connected water meter installed at the property. The connected water meter may periodically transmit the water consumption data to the server while water is being consumed at (e.g., flowing into) the property by one or more water consuming appliances.

The server may obtain 610 sensor data from one or more other monitoring system sensors installed at the property. The sensor data may include such as sensor data from one or more energy sensors indicating whether one or more water consuming appliances are power-on or powered-off, sensor data from motion sensors indicating whether movement is detected within the property, sensor data indicating the number of occupants detected within the property (e.g., using motion sensors, location from user devices, user device pings, sensor data indicating the state of the monitoring system installed at the property (e.g., "armed-away," "armed-home," or "unarmed-home"), or a combination thereof.

The server determines 630 a flow rate threshold for the property. The flow rate threshold may include a flow rate such as "X" gallons per minute, where "X" is any positive, non-zero integer. In some implementations, the flow rate threshold may be set using a predetermined flow rate. In other implementations, the flow rate threshold may be dynamically determined based on property occupancy. By way of example, property occupancy may be determined based on sensor data obtained at stage 620. For example, the server may determine a higher flow rate threshold when there are multiple occupants at the property who have the potential to use water, when the server "knows" based on the obtained sensor data (e.g., energy sensor data) that one or more water consuming appliances are using water, or a combination thereof. Similarly, the server may determine a lower flow rate threshold when there are no occupants at the property, when the server "knows" based on the obtained sensor data (e.g., energy sensor data) that one or more water consuming appliances are powered-down and not using water, or a combination thereof. When using a pre-determined flow rate that is not based on property occupancy, the process 600 can be performed without obtaining the sensor data at stage 620.

The server may determine 640, based on the water consumption data, that the water flow rate at the property exceeds the flow rate threshold for the property. In response to determining that the flow rate of water at the property exceeds the flow rate threshold (e.g., "X" gallons per minute, where "X" is any positive, non-zero integer), the server may determine that there is a potential large water leak at the property. Alternatively, if the flow rate of the water at the property does not exceed a predetermined threshold, the server may continue monitoring subsequently obtained water consumption data from the property and evaluating the subsequently obtained water consumption data from the property to determine if the subsequently obtained water consumption data exceeds the predetermined threshold or otherwise meets or exceeds one or more other leak detection criteria discussed herein. In some implementations, the server may also analyze the water consumption data to detect other types of leaks using the techniques of FIGS. 7 and 8.

If the server determines at stage 640 that there is a potential large water leak at the property (e.g., because the water flow rate at the property exceeds the flow rate threshold), then the server may perform 650 one or more operations to mitigate potential damage caused by the detected leak. In some implementations, the server may determine one or more particular operations to perform to mitigate potential damaged caused by the detected leak based on the particular type of water leak that is detected. For example, for a large leak detected using a flow rate threshold, the server can generate and transmit a message to the connected water meter via one or more networks that instructs a connected shut-off valve to close. In response, the connected shut-off valve may receive the message, process the instructions included in the message, and close the connected water value, thereby cutting the property off from the water supply and stopping the leak.

Alternatively, or in addition, for example, the server can transmit notification to a mobile device of a legitimate occupant of the property to notify the legitimate occupant of the property of the leak. The notification may trigger the display of a graphical user interface in the display of the legitimate occupant's mobile device. The graphical user interface may display visual representations of the water consumption data for the property. The graphical user interface may also provide the legitimate occupant the property with a selectable icon whose selection can trigger an instruction to be transmitted to the connected shut-off valve to initiate closing of the connected shut-off valve.

In some implementations, performing 650 one or more operations to mitigate potential damage caused by the detected leak may include initiating performance of the mitigating operations. Initiating performance of one or more operations to mitigate potential damage may include the server instructing another component of a connected-monitoring system to perform an operation (e.g., instructing a connected water meter to close a water shut off valve). By way of another example, initiating performance of one or more operations to mitigate potential damage may include initiating transmission of one or more notifications to a user device that are configured to alert a lawful property occupant (e.g., a property resident) of the detection of a water leak.

Figure 7:
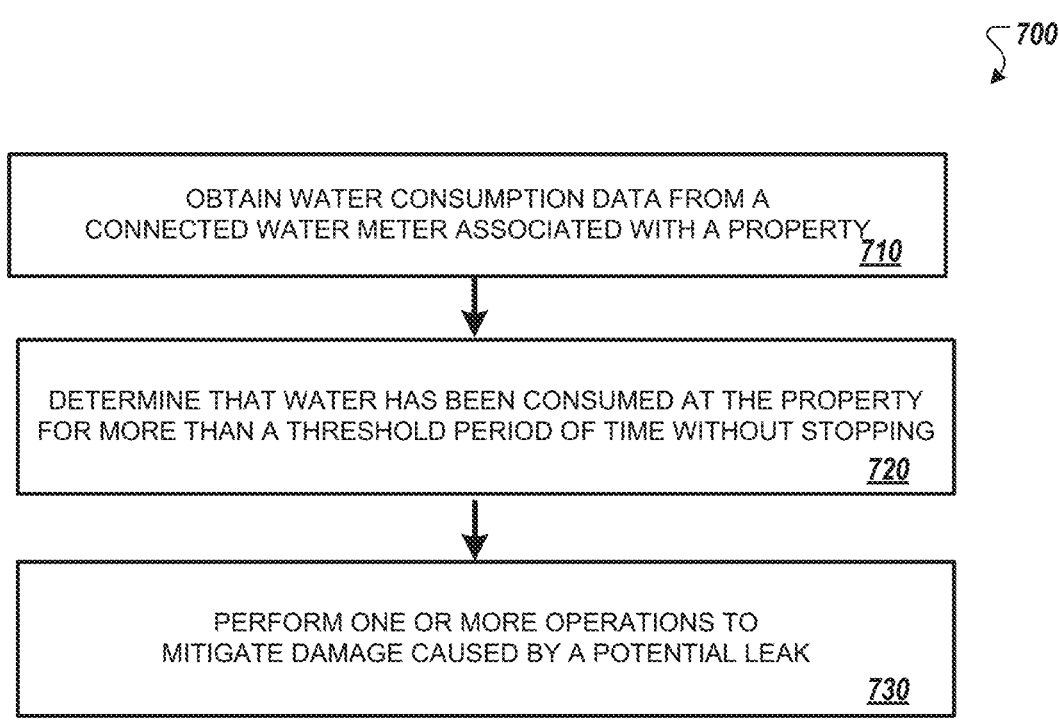
FIG. 7 is another flowchart of another example of a process for detecting a water leak.

FIG. 7 is another flowchart of another example of a process 700 for detecting a water leak. Generally, the process 700 includes obtaining water consumption data from a connected water meter associated with a property (710), determining that water has been consumed at the property for more than a threshold period of time without stopping (720), and performing one or more operations to mitigate potential damage caused by the potential leak. For convenience, the process 700 will be described below as being performed by a server such as the monitoring application server 190 of FIGS. 1, 2, and 4.

In more detail, the server may begin performing the process 700 by obtaining 710 water consumption data from a connected water meter associated with a property. In some implementations, the water consumption data may include sensor data generated by one or more sensors at the property that describes water consumption at the property. In other implementations the water consumption data may include data describing water consumption data that is based on the sensor data generated by one or more sensors at the property without receiving the sensor data generated by the one or more sensors itself. The water consumption data may include data describing water consumption at the property such as a waveform indicating the shape of a water consumption curve, an amplitude of the underlying water flow rate (e.g., an amplitude of the water consummation curve), a value representing the water flow rate (e.g., gallons per minute), or the like. The water consumption data may be generated by a sensor that is associated with the connected water meter based on the sensors detection of the water flow rate. The water consumption data may be obtained from a connected water meter installed at the property. The connected water meter may periodically transmit the water consumption data to the server while water is being consumed at (e.g., flowing into) the property by one or more water consuming appliances.

The server is configured to analyze the obtained water consumption data to determine 720 whether the water has been consumed at the property for more than a threshold period of time without stopping. The threshold period of time may include, for example, 1 hours, 3 hours, 5 hours, or the like). In response to determining that the consumption (or flow) of water has been detected for more than a predetermined period of time (e.g., 1 hour, 3 hours, 5 hours, or the like), the server may determine that there is a leak at the property. Alternatively, for example, if server determines that water has not been consumed at the property for more than a threshold period of time, without stopping, the server may continue to analyze the water consumption data to determine if one of the leak detection criteria discussed here have occurred. In some implementations, the server may also analyze the water consumption data to detect other types of leaks using the techniques of FIGS. 6 and 8.

If the server determines at stage 720 that there is a potential water leak at the property (e.g., because the water has been consumed at the property for more than a threshold period of time), then the server may perform 730 one or more operations to mitigate potential damage caused by the detected leak. In some implementations, the server may determine one or more particular operations to perform to mitigate potential damage caused by the detected leak based on the particular type of leak that is detected. For example, for a small, medium, or non-catastrophic leak, the server can transmit a notification to a mobile device of a legitimate occupant of the property to notify the legitimate occupant of the property of the leak. The notification may trigger the display of a graphical user interface in the display of the legitimate occupant's mobile device. The graphical user interface may display visual representations of the water consumption data for the property. The graphical user interface may also provide the legitimate occupant the property with a selectable icon whose selection can trigger an instruction to be transmitted to the connected shut-off valve to initiate closing of the connected shut-off valve.

In some implementations, performing 750 one or more operations to mitigate potential damage caused by the detected leak may include initiating performance of the mitigating operations. Initiating performance of one or more operations to mitigate potential damage may include the server instructing another component of a connected-monitoring system to perform an operation (e.g., instructing a connected water meter to close a water shut off valve). By way of another example, initiating performance of one or more operations to mitigate potential damage may include initiating transmission of one or more notifications to a user device that are configured to alert a lawful property occupant (e.g., a property resident) of the detection of a water leak.

Figure 8:
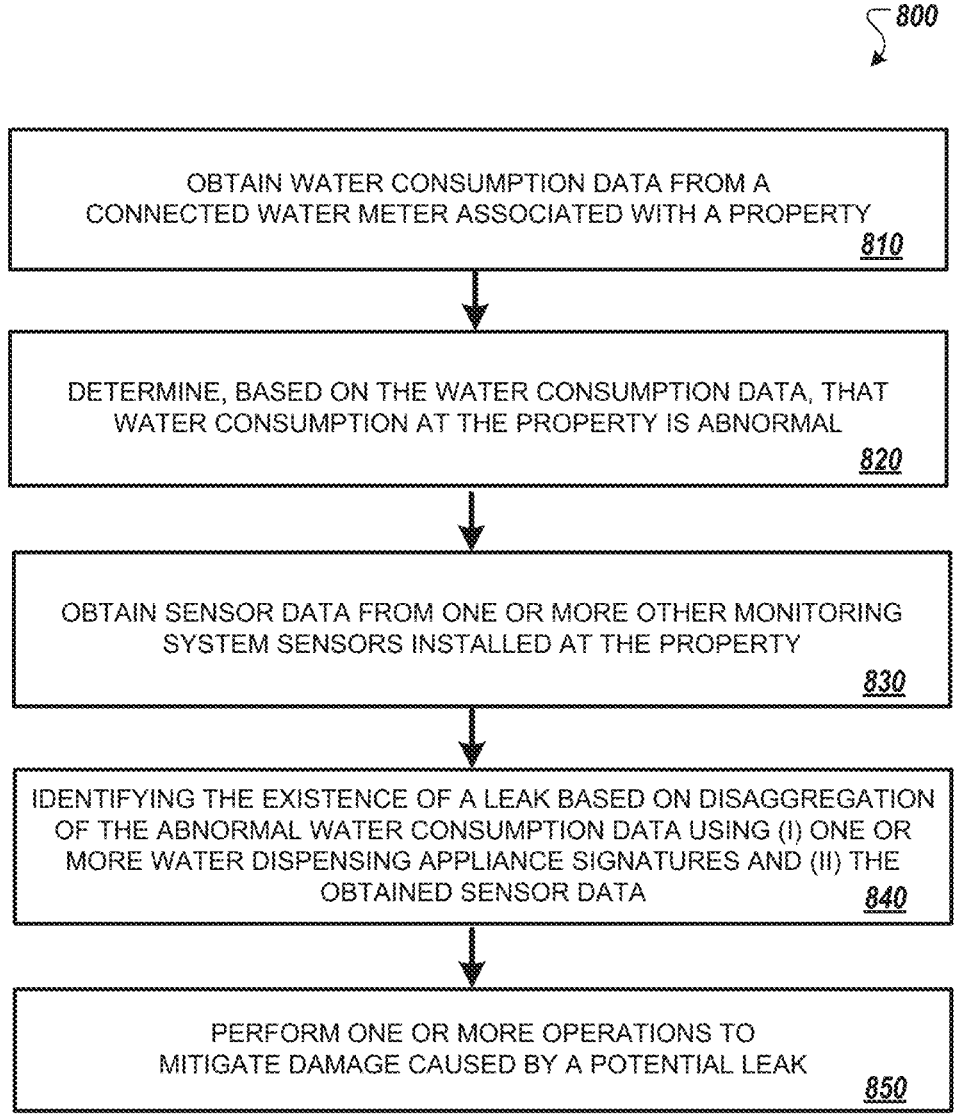
FIG. 8 is another flowchart of another example of a process for detecting a water leak.

FIG. 8 is another flowchart of another example of a process 800 for detecting a water leak. Generally, the process 800 may include obtaining water consumption data from a connected water meter associated with a property (810), determining, based on the water consumption data, that water consumption property is abnormal (820), obtaining sensor data from one or more other monitoring system sensors installed at the property (830), identifying the existence of a leak based on disaggregation of the abnormal water consumption data using (I) one or more water consuming appliance signatures and (II) the obtained sensor data (840), and performing one or more operations to mitigate damage caused by a potential leak (850). For convenience, the process 800 will be described below as being performed by a server such as the monitoring application server 190 of FIGS. 1, 2, and 4.

In more detail, the server may begin performing the process 800 by obtaining 810 water consumption data from a connected water meter associated with a property. In some implementations, the water consumption data may include sensor data generated by one or more sensors at the property that describes water consumption at the property. In other implementations the water consumption data may include data describing water consumption data that is based on the sensor data generated by one or more sensors at the property without receiving the sensor data generated by the one or more sensors itself. The water consumption data may include data describing water consumption at the property such as a waveform indicating the shape of a water consumption curve, an amplitude of the underlying water flow rate (e.g., an amplitude of the water consummation curve), a value representing the water flow rate (e.g., gallons per minute), or the like. The water consumption data may be generated by a sensor that is associated with the connected water meter based on the sensors detection of the water flow rate. The water consumption data may be obtained from a connected water meter installed at the property. The connected water meter may periodically transmit the water consumption data to the server while water is being consumed at (e.g., flowing into) the property by one or more water consuming appliances.

The server can determine 820, based on the water consumption data, that water consumption at the property is abnormal. Determining, based on the water consumption data, that water consumption at the property is abnormal may include, for example, comparing the water consumption data obtained at stage 810 to historical water consumption data maintained for the property. The server may determine that the water consumption at the property is abnormal if, for example, water consumption deviates from the property's historical water consumption by more than threshold flow rate amount.

Various types of historical water consumption data may be maintained by the server. For example, the historical water consumption data maintained by the server may include historical water consumption profiles constructed by the server, historical water consumption profiles obtained from a third party, or a combination thereof. Historical water consumption profiles may include daily, weekly, or monthly water consumption profiles that represent a property's water consumption for the respective historical time period (e.g., daily, weekly, or monthly). The server can use such historical water consumption profiles to identify, or otherwise determine, a variation in a property's water consumption during one or more time periods. For example, the historical water consumption profiles may be analyzed by, for example, comparing the historical water consumption profiles to respective current water consumption profiles, in order to determine the variation in the property's water consumption for each respective day of a week.

Alternatively, or in addition, the server can generate historical water consumption profiles for particular time periods such as 3 hour time periods. Then, the server can identify abnormalities in water consumption by determining that current water consumption for a current 3 hour time period is different than the historical water consumption for that 3 hour time period. Though the example given here uses a daily water consumption profile based on 3 hour time periods, the present disclosure need not be so limited. Instead, other time periods of other time durations may also be used. Alternatively, or in addition, other types of historical consumption profiles may be generated such as multi-variable historical consumption profiles. For example, the server can generate a historical consumption profile for a property for Tuesdays from 6:00-9:00 am when 2 occupants are in the home.

For instances when the server constructs (or generates) a historical consumption profile, determining whether water usage at the property is abnormal may include comparing current water consumption data to the constructed historical consumption profile. This may require the server to generate a current consumption profile based on current water consumption data that can be compared to the historical consumption profile. In some implementations, the current consumption profile may be a multi-variable consumption profile that in addition to water consumption data (e.g., number of gallons consumed, a flow rate of a number of gallons per minute, or the like) may also include other types of property-specific information such as a time of day, a day of the week, a calendar date, data collected by the monitoring system, or a combination thereof. The data collected by the monitoring system may include property occupancy (e.g., how many persons are present at the property), number of devices using power at the property, whether any objects are moving inside the property, number objects moving inside the property, or any other data that can be collected by the monitoring system described herein. Multi-variable consumption profiles may then be compared to one or more historical consumption profiles that were previously generated (or otherwise obtained by) the server in order to determine if the property's water consumption is abnormal under the current set of variables associated with the property. A property's water usage may be determined to be abnormal if water usage data associated with a water consumption profile deviates from one or more historical consumption profiles by more than a threshold amount.

The server may obtain 830 sensor data from one or more other monitoring system sensors installed at the property (830). In some implementations, the sensor data may be obtained in response to the server determining that water consumption at the property is abnormal. Alternatively, or in addition, the sensor data may be obtained prior to the server determining that water consumption at the property is abnormal. The sensor data may include such as sensor data from one or more energy sensors indicating whether one or more water consuming appliances are power-on or powered-off, sensor data from motion sensors indicating whether movement is detected within the property, sensor data indicating the number of occupants detected within the property (e.g., using motion sensors, location from user devices, user device pings, sensor data indicating the state of the monitoring system installed at the property (e.g., "armed-away," "armed-home," or "unarmed-home"), or a combination thereof.

The server can identify 840 the existence of a leak based on disaggregation of the abnormal water consumption data using (I) one or more water consuming appliance signatures and (II) the obtained sensor data (840) Identifying the existence of a leak based on disaggregation of the abnormal water usage may include identifying an amount of water usage that is unaccounted for after reverse engineering water consumption data corresponding to the abnormal water usage using one or more water consuming signatures for respective water consuming appliances. The server may determine that the unaccounted water usage does not match any water consuming signatures associated with a water consuming appliance installed at the property. In such instances, the server may determine that the water usage that is unaccounted for represents a potential leak.

If the server determines at stage 840 that there is a potential water leak at the property (e.g., because the server identified water usage that is unaccounted for after disaggregation of the abnormal water usage), then the server may perform 850 one or more operations to mitigate potential damage caused by the detected leak. In some implementations, the server may determine one or more particular operations to perform to mitigate potential damage caused by the detected leak based on the particular type of leak that is detected. For example, for a small, medium, or non-catastrophic leak, the server can transmit a notification to a mobile device of a legitimate occupant of the property to notify the legitimate occupant of the property of the leak. The notification may trigger the display of a graphical user interface in the display of the legitimate occupant's mobile device. The graphical user interface may display visual representations of the water consumption data for the property. The graphical user interface may also provide the legitimate occupant the property with a selectable icon whose selection can trigger an instruction to be transmitted to the connected shut-off valve to initiate closing of the connected shut-off valve.

In some implementations, performing 850 one or more operations to mitigate potential damage caused by the detected leak may include initiating performance of the mitigating operations. Initiating performance of one or more operations to mitigate potential damage may include the server instructing another component of a connected-monitoring system to perform an operation (e.g., instructing a connected water meter to close a water shut off valve). By way of another example, initiating performance of one or more operations to mitigate potential damage may include initiating transmission of one or more notifications to a user device that are configured to alert a lawful property occupant (e.g., a property resident) of the detection of a water leak.

Figure 9:
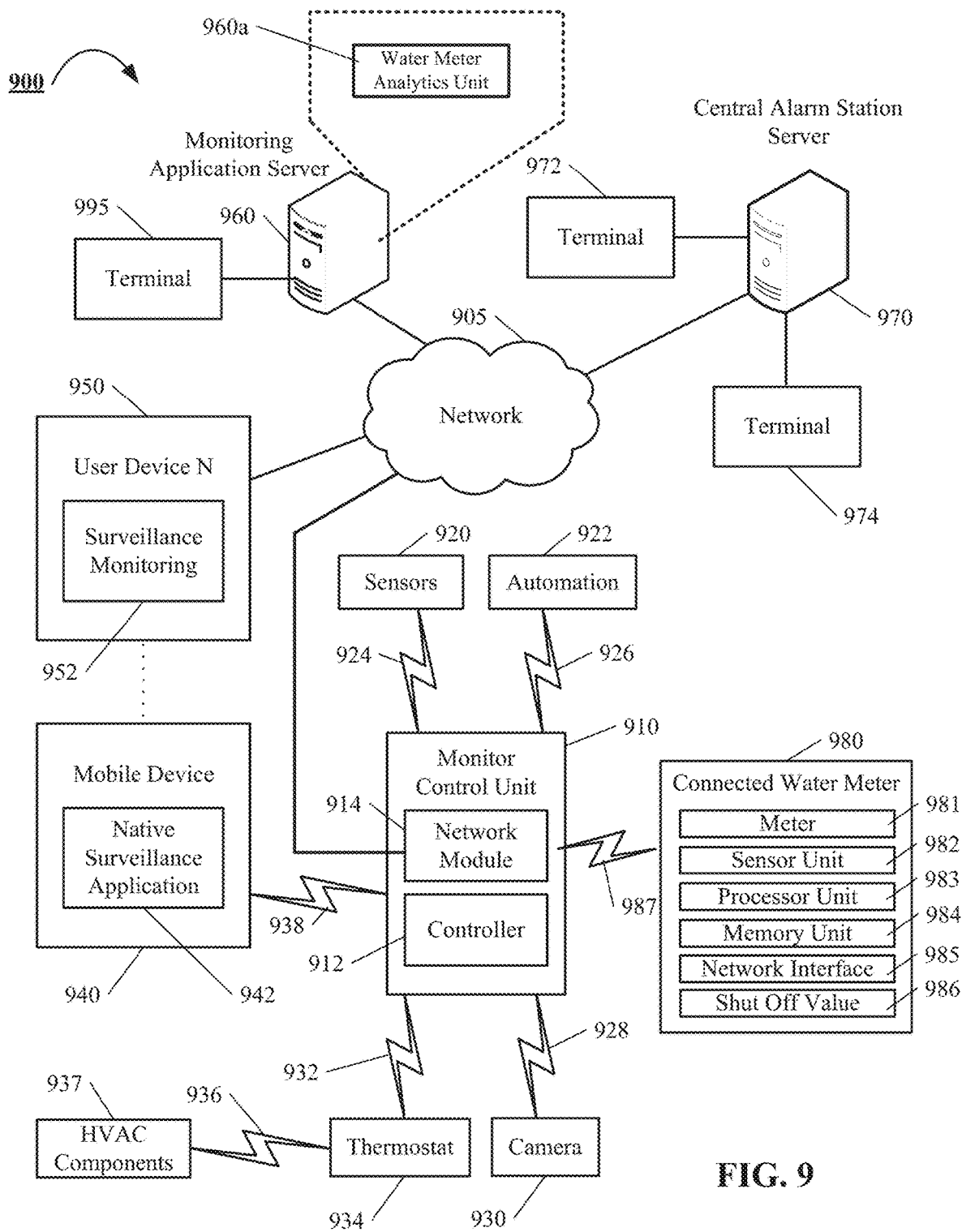
FIG. 9 is a block diagram of an example of components that can be used for detecting water leaks.

FIG. 9 is a block diagram of an example of components that can be used for detecting water leaks.

The electronic system 900 includes a network 905, a monitoring system control unit 910, one or more user devices 940, 950, a monitoring application server 960, and a central alarm station server 970. In some examples, the network 905 facilitates communications between the monitoring system control unit 910, the one or more user devices 940, 950, the monitoring application server 960, and the central alarm station server 970.

The network 905 is configured to enable exchange of electronic communications between devices connected to the network 905. For example, the network 905 may be configured to enable exchange of electronic communications between the monitoring system control unit 910, the one or more user devices 940, 950, the monitoring application server 960, and the central alarm station server 970. The network 905 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 905 may include multiple networks or subnetworks, each of which may include, for example, a wired or wireless data pathway. The network 905 may include a circuit-switched network, a packet-switched data network, or any other network able to carry electronic communications (e.g., data or voice communications). For example, the network 905 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 905 may include one or more networks that include wireless data channels and wireless voice channels. The network 905 may be a wireless network, a broadband network, or a combination of networks including a wireless network and a broadband network.

The monitoring system control unit 910 includes a controller 912 and a network module 914. The controller 912 is configured to control a monitoring system (e.g., a home alarm or security system) that includes the monitoring system control unit 910. In some examples, the controller 912 may include a processor or other control circuitry configured to execute instructions of a program that controls operation of an alarm system. In these examples, the controller 912 may be configured to receive input from sensors, detectors, or other devices included in the alarm system and control operations of devices included in the alarm system or other household devices (e.g., a thermostat, an appliance, lights, etc.). For example, the controller 912 may be configured to control operation of the network module 914 included in the monitoring system control unit 910.

The network module 914 is a communication device configured to exchange communications over the network 905. The network module 914 may be a wireless communication module configured to exchange wireless communications over the network 905. For example, the network module 914 may be a wireless communication device configured to exchange communications over a wireless data channel and a wireless voice channel. In this example, the network module 914 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 914 also may be a wired communication module configured to exchange communications over the network 905 using a wired connection. For instance, the network module 914 may be a modem, a network interface card, or another type of network interface device. The network module 914 may be an Ethernet network card configured to enable the monitoring system control unit 910 to communicate over a local area network and/or the Internet. The network module 914 also may be a voiceband modem configured to enable the alarm panel to communicate over the telephone lines of Plain Old Telephone Systems (POTS).

The monitoring system that includes the monitoring system control unit 910 includes one or more sensors or detectors. For example, the monitoring system may include multiple sensors 920. The sensors 920 may include a contact sensor, a motion sensor, a glass break sensor, or any other type of sensor included in an alarm system or security system. The sensors 920 also may include an environmental sensor, such as a temperature sensor, a water sensor, a rain sensor, a wind sensor, a light sensor, a smoke detector, a carbon monoxide detector, an air quality sensor, etc. The sensors 920 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 920 may include a radio-frequency identification (RFID) sensor that identifies a particular article that includes a pre-assigned RFID tag.

The monitoring system control unit 910 communicates with the module 922 and the camera 930 to perform surveillance or monitoring. The module 922 is connected to one or more devices that enable home automation control. For instance, the module 922 may be connected to one or more lighting systems and may be configured to control operation of the one or more lighting systems. Also, the module 922 may be connected to one or more electronic locks at the property and may be configured to control operation of the one or more electronic locks (e.g., control Z-Wave locks using wireless communications in the Z-Wave protocol. Further, the module 922 may be connected to one or more appliances at the property and may be configured to control operation of the one or more appliances. The module 922 may include multiple modules that are each specific to the type of device being controlled in an automated manner. The module 922 may control the one or more devices based on commands received from the monitoring system control unit 210. For instance, the module 222 may cause a lighting system to illuminate an area to provide a better image of the area when captured by a camera 230.

The camera 930 may be a video/photographic camera or other type of optical sensing device configured to capture images. For instance, the camera 930 may be configured to capture images of an area within a building monitored by the monitoring system control unit 910. The camera 930 may be configured to capture single, static images of the area and also video images of the area in which multiple images of the area are captured at a relatively high frequency (e.g., thirty images per second). The camera 930 may be controlled based on commands received from the monitoring system control unit 910.

The camera 930 may be triggered by several different types of techniques. For instance, a Passive Infra Red (PIR) motion sensor may be built into the camera 930 and used to trigger the camera 930 to capture one or more images when motion is detected. The camera 930 also may include a microwave motion sensor built into the camera and used to trigger the camera 930 to capture one or more images when motion is detected. The camera 930 may have a "normally open" or "normally closed" digital input that can trigger capture of one or more images when external sensors (e.g., the sensors 920, PIR, door/window, etc.) detect motion or other events. In some implementations, the camera 930 receives a command to capture an image when external devices detect motion or another potential alarm event. The camera 930 may receive the command from the controller 912 or directly from one of the sensors 920.

In some examples, the camera 930 triggers integrated or external illuminators (e.g., Infra Red, Z-wave controlled "white" lights, lights controlled by the module 922, etc.) to improve image quality when the scene is dark. An integrated or separate light sensor may be used to determine if illumination is desired and may result in increased image quality.

The camera 930 may be programmed with any combination of time/day schedules, system "arming state", or other variables to determine whether images should be captured or not when triggers occur. The camera 930 may enter a low-power mode when not capturing images. In this case, the camera 930 may wake periodically to check for inbound messages from the controller 912. The camera 930 may be powered by internal, replaceable batteries if located remotely from the monitoring system control unit 910. The camera 930 may employ a small solar cell to recharge the battery when light is available. Alternatively, the camera 930 may be powered by the controller's 912 power supply if the camera 930 is co-located with the controller 912.

In some implementations, the camera 930 communicates directly with the monitoring application server 960 over the Internet. In these implementations, image data captured by the camera 930 does not pass through the monitoring system control unit 910 and the camera 930 receives commands related to operation from the monitoring application server 960.

The system 900 also includes thermostat 934 to perform dynamic environmental control at the property. The thermostat 934 is configured to monitor temperature and/or energy consumption of an HVAC system associated with the thermostat 934, and is further configured to provide control of environmental (e.g., temperature) settings. In some implementations, the thermostat 934 can additionally or alternatively receive data relating to activity at a property and/or environmental data at a property, e.g., at various locations indoors and outdoors at the property. The thermostat 934 can directly measure energy consumption of the HVAC system associated with the thermostat, or can estimate energy consumption of the HVAC system associated with the thermostat 934, for example, based on detected usage of one or more components of the HVAC system associated with the thermostat 934. The thermostat 934 can communicate temperature and/or energy monitoring information to or from the monitoring system control unit 910 and can control the environmental (e.g., temperature) settings based on commands received from the monitoring system control unit 910.

In some implementations, the thermostat 934 is a dynamically programmable thermostat and can be integrated with the monitoring system control unit 910. For example, the dynamically programmable thermostat 934 can include the monitoring system control unit 910, e.g., as an internal component to the dynamically programmable thermostat 934. In addition, the monitoring system control unit 910 can be a gateway device that communicates with the dynamically programmable thermostat 934.

A module 937 is connected to one or more components of an HVAC system associated with a property, and is configured to control operation of the one or more components of the HVAC system. In some implementations, the module 937 is also configured to monitor energy consumption of the HVAC system components, for example, by directly measuring the energy consumption of the HVAC system components or by estimating the energy usage of the one or more HVAC system components based on detecting usage of components of the HVAC system. The module 937 can communicate energy monitoring information and the state of the HVAC system components to the thermostat 934 and can control the one or more components of the HVAC system based on commands received from the thermostat 934.

The system 900 further includes a connected water meter 980. The connected water meter may include water meter 981, a sensor unit 982, a processor unit 983, a memory unit 984, a network interface 985, and a connected shut-off valve. The water meter 981 may measure water usage of a property where the connected water meter 980 is installed. The water meter 981 may measure water in terms of a unit of volume such as liters, gallons, or the like. The measurements of the water meter 981 may be used by a utility company to determine a monthly water consumption total. The sensor unit 982 may include one or more sensors configured to detect water flow and generate sensor data. The sensor data generated by the sensors unit 982 may be used to generate a waveform indicating the shape of a water consumption curve, an amplitude of the underlying water flow rate, or the like.

In some implementations, the connected water meter 980 may also include a thermal component that can heat water in the vicinity of the one or more sensing unit 982 sensors. The one or more sensing unit 982 sensors may then evaluate the thermal profile of the heated water to determine if cooler water is displacing the heated water. The one sensing unit 982 may calculate the flow rate of the water based on the rate of displacement of the heated water by the cooler water.

The sensor data generated by the sensing unit 982 may be stored in the memory unit 984, and may be periodically transmitted to a monitoring application server 990 using the network interface 985, one or more communication links 987, the network 905, the network module 914, a combination thereof, or the like. In some implementations, the connected water meter 980 may use a processing unit 983 to process the sensor data stored in the memory unit 984 to generate periodic consumption reports that may be transmitted to the monitoring application server 960. Alternatively, the connected water meter 980 may use the network interface 985, one or more communication links 987, the network module 914, the network 905, a combination thereof, or the like to transmit the sensor data to the monitoring application server 960. In such instances, the monitoring application server may then generate a periodic consumption report that can be analyzed by the water meter analytics unit 960*a*. Alternatively, the monitoring application server 960 can forward the sensor data generated by the sensor unit 982 to the water meter analytics unit 960*a* for analysis without generating a periodic consumption report.

The processing unit 983 may include one or more processors. The processing unit 983 may access, and process, instructions stored in the memory unit 984 to realize the functionality of the connected water meter 980 described by this specification.

The connected shut-off valve 986 may be configured to close, or open, the shut-off valve in response instructions from one or more remote computers such as the monitoring application server 990, the user device 940, the user device 950, the central alarm station server, or the like. The connected shut-off valve 986 may be configured to have its own network interface that is configured to receive instructions to close, or open, the shut-off valve. Alternatively, the connected water meter 980 may include a single network interface 185 that can received instructions from one or more remote computers, and forward the instructions to the connected shut-off valve 986.

The sensors 920, the module 922, the camera 930, the thermostat 934, and the connected water meter 980 communicate with the controller 912 over communication links 924, 926, 928, 932, 984, and 987. The communication links 924, 926, 928, 932, 984, and 987 may be a wired or wireless data pathway configured to transmit signals from the sensors 920, the module 922, the camera 930, the thermostat 934, and the connected water meter 980 to the controller 912. The sensors 920, the module 922, the camera 930, the thermostat 934, and the connected water meter 980 may continuously transmit sensed values to the controller 912, periodically transmit sensed values to the controller 912, or transmit sensed values to the controller 912 in response to a change in a sensed value.

The communication links 924, 926, 928, 932, 984, and 987 may include a local network. The sensors 920, the module 922, the camera 930, the thermostat 934, and the connected water meter 980 and the controller 912 may exchange data and commands over the local network. The local network may include 902.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 9 (CATS) or Category 9 (CAT6) wired Ethernet network. The local network may be a mesh network constructed based on the devices connected to the mesh network.

The monitoring application server 960 is an electronic device configured to provide monitoring services by exchanging electronic communications with the monitoring system control unit 910, the one or more user devices 940, 950, and the central alarm station server 970 over the network 905. For example, the monitoring application server 960 may be configured to monitor events (e.g., alarm events) generated by the monitoring system control unit 910. In this example, the monitoring application server 960 may exchange electronic communications with the network module 914 included in the monitoring system control unit 910 to receive information regarding events (e.g., alarm events) detected by the monitoring system control unit 910. The monitoring application server 960 also may receive information regarding events (e.g., alarm events) from the one or more user devices 940, 950.

In some examples, the monitoring application server 960 may route alarm data received from the network module 914 or the one or more user devices 940, 950 to the central alarm station server 970. For example, the monitoring application server 960 may transmit the alarm data to the central alarm station server 970 over the network 905.

The monitoring application server 960 may store sensor and image data received from the monitoring system and perform analysis of sensor and image data received from the monitoring system. Based on the analysis, the monitoring application server 960 may communicate with and control aspects of the monitoring system control unit 910, the connected water meter 980, the one or more user devices 940, 950, or a combination thereof.

The monitoring application server 960 may include a water meter analytics unit 960*a*. The water meter analytics unit 960*a* may analyze water consumption data such sensor data generated by the sensor unit 982 in order to detect leaks as described above with respect to FIGS. 1-8. Alternatively, or in addition, the water meter analytics unit 960*a* may be configured to analyze water consumption data such as sensor data, periodic consumption reports, or the like in order to identify the one or more types of water consuming appliances that consumed water during the time period associated with the sensor data generated by the sensor unit 982, the time period associated with a period consumption report, or the like. The analysis performed by the water meter analytics unit 960a may include an isolated events analysis, an overlapping events analysis, or the like.

The central alarm station server 970 is an electronic device configured to provide alarm monitoring service by exchanging communications with the monitoring system control unit 910, the connected water meter 980, the one or more mobile devices 940, 950, and the monitoring application server 960 over the network 905. For example, the central alarm station server 970 may be configured to monitor alarm events generated by the monitoring system control unit 910. In this example, the central alarm station server 970 may exchange communications with the network module 914 included in the monitoring system control unit 910 to receive information regarding alarm events detected by the monitoring system control unit 910. The central alarm station server 970 also may receive information regarding alarm events from the one or more mobile devices 940, 950, the connected water meter 980, and/or the monitoring application server 960.

The central alarm station server 970 is connected to multiple terminals 972 and 974. The terminals 972 and 974 may be used by operators to process alarm events. For example, the central alarm station server 970 may route alarm data to the terminals 972 and 974 to enable an operator to process the alarm data. The terminals 972 and 974 may include general-purpose computers (e.g., desktop personal computers, workstations, or laptop computers) that are configured to receive alarm data from a server in the central alarm station server 970 and render a display of information based on the alarm data. For instance, the controller 912 may control the network module 914 to transmit, to the central alarm station server 970, alarm data indicating that a sensor 920 detected a door opening when the monitoring system was armed. The central alarm station server 970 may receive the alarm data and route the alarm data to the terminal 972 for processing by an operator associated with the terminal 972. The terminal 972 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 972 and 974 may be mobile devices or devices designed for a specific function. Although FIG. 9 illustrates two terminals for brevity, actual implementations may include more (and, perhaps, many more) terminals.

The one or more user devices 940, 950 are devices that host and display user interfaces. For instance, the user device 940 is a mobile device that hosts one or more native applications (e.g., the native surveillance application 942). The user device 940 may be a cellular phone or a non-cellular locally networked device with a display. The user device 940 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 940 may perform functions unrelated to the monitoring system, such as placing personal telephone calls, playing music, playing video, displaying pictures, browsing the Internet, maintaining an electronic calendar, etc.

The user device 940 includes a native surveillance application 942. The native surveillance application 942 refers to a software/firmware program running on the corresponding mobile device that enables the user interface and features described throughout. The user device 940 may load or install the native surveillance application 942 based on data received over a network or data received from local media. The native surveillance application 942 runs on mobile devices platforms, such as iPhone, iPod touch, Blackberry, Google Android, Windows Mobile, etc. The native surveillance application 942 enables the user device 940 to receive and process image and sensor data from the monitoring system.

The user device 950 may be a general-purpose computer (e.g., a desktop personal computer, a workstation, or a laptop computer) that is configured to communicate with the monitoring application server 960 and/or the monitoring system control unit 910 over the network 905. The user device 950 may be configured to display a surveillance monitoring user interface 952 that is generated by the user device 950 or generated by the monitoring application server 960. For example, the user device 950 may be configured to display a user interface (e.g., a web page) provided by the monitoring application server 960 that enables a user to perceive images captured by the camera 930 and/or reports related to the monitoring system. Although FIG. 9 illustrates two user devices for brevity, actual implementations may include more (and, perhaps, many more) or fewer user devices.

In some implementations, the one or more user devices 940, 950 communicate with and receive monitoring system data from the monitoring system control unit 910 using the communication link 938. For instance, the one or more user devices 940, 950 may communicate with the monitoring system control unit 910 using various local wireless protocols such as Wi-Fi, Bluetooth, Z-Wave, ZigBee, HomePlug (Ethernet over powerline), or wired protocols such as Ethernet and USB, to connect the one or more user devices 940, 950 to local security and automation equipment. The one or more user devices 940, 950 may connect locally to the monitoring system and its sensors and other devices. The local connection may improve the speed of status and control communications because communicating through the network 905 with a remote server (e.g., the monitoring application server 960) may be significantly slower.

Although the one or more user devices 940, 950 are shown as communicating with the monitoring system control unit 910, the one or more user devices 940, 950 may communicate directly with the sensors and other devices controlled by the monitoring system control unit 910. In some implementations, the one or more user devices 940, 950 replace the monitoring system control unit 910 and perform the functions of the monitoring system control unit 910 for local monitoring and long range/offsite communication.

In other implementations, the one or more user devices 940, 950 receive monitoring system data captured by the monitoring system control unit 910 through the network 905. The one or more user devices 940, 950 may receive the data from the monitoring system control unit 910 through the network 905 or the monitoring application server 960 may relay data received from the monitoring system control unit 910 to the one or more user devices 940, 950 through the network 905. In this regard, the monitoring application server 960 may facilitate communication between the one or more user devices 940, 950 and the monitoring system.

In some implementations, the one or more user devices 940, 950 may be configured to switch whether the one or more user devices 940, 950 communicate with the monitoring system control unit 910 directly (e.g., through link 938) or through the monitoring application server 960 (e.g., through network 905) based on a location of the one or more user devices 940, 950. For instance, when the one or more user devices 940, 950 are located close to the monitoring system control unit 910 and in range to communicate directly with the monitoring system control unit 910, the one or more user devices 940, 950 use direct communication. When the one or more user devices 940, 950 are located far from the monitoring system control unit 910 and not in range to communicate directly with the monitoring system control unit 210, the one or more user devices 940, 950 use communication through the monitoring application server 960.

Although the one or more user devices 940, 950 are shown as being connected to the network 905, in some implementations, the one or more user devices 940, 950 are not connected to the network 905. In these implementations, the one or more user devices 940, 950 communicate directly with one or more of the monitoring system components and no network (e.g., Internet) connection or reliance on remote servers is needed.

In other implementations, the system 900 further includes network 905 and the sensors 920, the module 922, the camera 930, the thermostat 934, and the connected water meter 980 is configured to communicate sensor, image data, or both to the one or more user devices 940, 950 over network 905 (e.g., the Internet, cellular network, etc.). In yet another implementation, the sensors 920, the module 922, the camera 930, the thermostat 934, and the connected water meter 980 (or a component, such as a bridge/router) are intelligent enough to change the communication pathway from a direct local pathway when the one or more user devices 940, 950 are in close physical proximity to the sensors 920, the module 922, the camera 930, the thermostat 934, and the connected water meter 980 to a pathway over network 905 when the one or more user devices 940, 950 are farther from the sensors 920, the module 922, the camera 930, the thermostat 934, and the connected water meter 980. In some examples, the system leverages GPS information from the one or more user devices 940, 950 to determine whether the one or more user devices 940, 950 are close enough to the sensors 920, the module 922, the camera 930, the thermostat 934, and the connected water meter 980 to use the direct local pathway or whether the one or more user devices 940, 950 are far enough from the sensors 920, the module 922, the camera 930, the thermostat 934, and the connected water meter 980 that the pathway over network 905 is required. In other examples, the system leverages status communications (e.g., pinging) between the one or more user devices 940, 950 and the sensors 920, the module 922, the camera 930, the thermostat 934, and the connected water meter 980 to determine whether communication using the direct local pathway is possible. If communication using the direct local pathway is possible, the one or more user devices 940, 950 communicate with the sensors 920, the module 922, the camera 930, the thermostat 934, and the connected water meter 980 using the direct local pathway. If communication using the direct local pathway is not possible, the one or more user devices 940, 950 communicate with the sensors 920, the module 922, the camera 930, the thermostat 934, and the connected water meter 980 using the pathway over network 905.

What is claimed is:

1. A system comprising:
   one or more processors and one or more computer storage media storing instructions that are operable, when executed by the one or more processors, to cause the one or more processors to perform operations comprising:
   obtaining, by a water meter analytics unit, aggregated water consumption data that reflects water consumption of multiple water consuming appliances at a property during a period of time;
   determining whether a particular water consuming appliance was being used during the period of time;
   in response to determining that the particular water consuming appliance was not being used during the period of time, disregarding, from a disaggregation of the aggregated water consumption data, a water consuming appliance signature of the particular water consuming appliance;
   based on the disaggregation of the aggregated water consumption data, determine that a water leak is occurring; and
   in response to determining that a water leak is occurring, transmitting an instruction to a water shut-off valve to shut the water shut-off valve.

2. The system of claim 1, wherein the disaggregation of the aggregated water consumption data comprises:
   including, in reconstructing the aggregated water consumption data, water consuming appliance signatures of water consuming appliances that were being used during the period of time; and
   disregarding, in reconstructing the aggregated water consumption data, water consuming appliance signatures of water consuming appliances that were not being used during the period of time.

3. The system of claim 2, wherein determining that a water leak is occurring comprises:
   determining, based on the water consuming appliance signatures of the water consuming appliances that were being used during the period of time, an expected water consumption at the property during the period of time; and
   determining that the aggregated water consumption data indicates that actual water consumption was greater than the expected water consumption at the property during the period of time.

4. The system of claim 1, wherein determining that the water leak is occurring comprises detecting, by the water meter analytics unit, a portion of the aggregated water consumption data that is unaccounted for based on the disaggregation of the aggregated water consumption data.

5. The system of claim 4, wherein determining that the water leak is occurring comprises determining that the portion of the aggregated water consumption data that is unaccounted for does not match a water consuming appliance signature of any water consuming appliance at the property.

6. The system of claim 4, the operations comprising:
   determining, based on the portion of the aggregated water consumption data that is unaccounted for, a size of the water leak.

7. The system of claim 1, the operations comprising:
   classifying the water leak as a severe water leak, a moderate water leak, or a minor water leak.

8. The system of claim 1, the operations comprising:
transmitting a notification to a user device of a user associated with the property indicating that the water leak is occurring.

9. The system of claim 1, the operations comprising:
transmitting an instruction to a user device of a user associated with the property that is configured to (i) generate a notification indicating that the water leak is occurring and (ii) output a selectable icon that, when selected, triggers transmission of the instruction to the water shut-off valve to shut the water shut-off valve.

10. The system of claim 1, the operations comprising:
determining whether a second particular water consuming appliance was being used during the period of time; and
in response to determining that the second particular water consuming appliance was being used during the period of time, including, in the disaggregation of the aggregated water consumption data, the water consuming appliance signature of the second particular water consuming appliance.

11. The system of claim 1, the operations comprising:
obtaining sensor data from a sensor at the property; and
determining, based on the sensor data, whether the particular water consuming appliance was being used during the period of time.

12. The system of claim 11, wherein the sensor data comprises occupancy data indicating an occupancy of the property.

13. The system of claim 11, wherein the sensor data comprises motion sensor data indicating motion or lack of motion occurring near the particular water consuming appliance.

14. The system of claim 11, wherein the sensor data comprises monitoring system data indicating an arming status of a monitoring system configured to monitor the property.

15. The system of claim 11, wherein the sensor data comprises energy sensors indicating a power status of the particular water consuming appliance.

16. A method comprising:
obtaining, by a water meter analytics unit, aggregated water consumption data that reflects water consumption of multiple water consuming appliances at a property during a period of time;
determining that a particular water consuming appliance was not being used during the period of time;
in response to determining that the particular water consuming appliance was not being used during the period of time, disregarding, from a disaggregation of the aggregated water consumption data, a water consuming appliance signature of the particular water consuming appliance;
based on the disaggregation of the aggregated water consumption data, determine that a water leak is occurring; and
in response to determining that a water leak is occurring, transmitting an instruction to a water shut-off valve to shut the water shut-off valve.

17. The method of claim 16, wherein the disaggregation of the aggregated water consumption data comprises:
including, in reconstructing the aggregated water consumption data, water consuming appliance signatures of water consuming appliances that were being used during the period of time; and
disregarding, in reconstructing the aggregated water consumption data, water consuming appliance signatures of water consuming appliances that were not being used during the period of time.

18. The method of claim 16, wherein determining that the water leak is occurring comprises detecting, by the water meter analytics unit, a portion of the aggregated water consumption data that is unaccounted for based on the disaggregation of the aggregated water consumption data.

19. A non-transitory computer readable storage medium storing instructions executable by a data processing apparatus and upon such execution cause the data processing apparatus to perform operations comprising:
obtaining, by a water meter analytics unit, aggregated water consumption data that reflects water consumption of multiple water consuming appliances at a property during a period of time;
determining whether a particular water consuming appliance was being used during the period of time;
in response to determining that the particular water consuming appliance was not being used during the period of time, disregarding, from a disaggregation of the aggregated water consumption data, a water consuming appliance signature of the particular water consuming appliance;
based on the disaggregation of the aggregated water consumption data, determine that a water leak is occurring; and
in response to determining that a water leak is occurring, transmitting an instruction to a water shut-off valve to shut the water shut-off valve.

* * * * *